(12) United States Patent
Lee et al.

(10) Patent No.: US 9,972,243 B2
(45) Date of Patent: May 15, 2018

(54) DISPLAY DEVICE AND METHOD OF DRIVING THE SAME

(71) Applicant: LG DISPLAY CO., LTD., Seoul (KR)

(72) Inventors: Unseon Lee, Gwangmyeong-si (KR); Dongyoup Shin, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days. days.

(21) Appl. No.: 15/387,203

(22) Filed: Dec. 21, 2016

(65) Prior Publication Data

US 2017/0186370 A1   Jun. 29, 2017

(30) Foreign Application Priority Data

Dec. 28, 2015 (KR) .................. 10-2015-0187532

(51) Int. Cl.
*G09G 3/3233* (2016.01)
*G09G 3/3266* (2016.01)
*G09G 3/3275* (2016.01)
*H04N 13/04* (2006.01)

(52) U.S. Cl.
CPC ......... *G09G 3/3233* (2013.01); *G09G 3/3266* (2013.01); *G09G 3/3275* (2013.01); *H04N 13/044* (2013.01); *H04N 13/0497* (2013.01); *G09G 2310/08* (2013.01); *G09G 2330/021* (2013.01); *G09G 2330/028* (2013.01); *G09G 2360/04* (2013.01)

(58) Field of Classification Search
CPC .. G09G 3/3233; G09G 3/3266; G09G 3/3677; G09G 3/3275; H04N 13/044; H04N 13/0497; H04N 13/0409
USPC ........................................ 345/212
See application file for complete search history.

(56) References Cited

U.S. PATENT DOCUMENTS 9,118,908 B2 * 8/2015 Sumi .................. H04N 13/0409
2014/0225817 A1 * 8/2014 Huang ................ G09G 3/3677
345/87

* cited by examiner

*Primary Examiner* — Fred Tzeng
(74) *Attorney, Agent, or Firm* — Seed Intellectual Property Law Group LLP

(57) ABSTRACT

A display device and a method of driving the same are disclosed. The display device includes a first driver integrated circuit configured to drive a first pixel array, a second driver integrated circuit configured to drive a second pixel array, a power module integrated circuit configured to receive an enable signal and output a driving voltage, and an AND gate configured to receive an output of the first driver integrated circuit and an output of the second driver integrated circuit and output the enable signal. The driving voltage output from the power module integrated circuit is commonly supplied to the first and second driver integrated circuits.

17 Claims, 17 Drawing Sheets

(a)

(b)

DISPLAY DEVICE AND METHOD OF DRIVING THE SAME

This application claims the benefit of Korean Patent Application No. 10-2015-0187532 filed on Dec. 28, 2015, the entire contents of which is incorporated herein by reference for all purposes as if fully set forth herein.

BACKGROUND

Field of the Invention

The present disclosure relates to a display device for generating electric power required to drive display panel, of which pixel arrays are separated, using one power module integrated circuit (PMIC) and a method of driving the display device.

Discussion of the Related Art

Virtual reality technology has been applied to a defense field, an architecture field, a tourist field, a film field, a multimedia field, a game field, and the like. Virtual reality means a specific environment or a specific situation allowing a user to feel as a real environment using a stereoscopic image technology.

The virtual reality technology has been applied to personal immersive devices, so as to maximize the immersion of the virtual reality. Examples of the personal immersive device include a head mounted display (HMD), a face mounted display (FMD), and an eye glasses-type display (EGD).

A performance of the personal immersive device was not as satisfactory as expected in terms of a stereoscopic feeling, an immersion, and a fatigue of a stereoscopic image, etc. as well as an uncomfortable appearance design. A method for displaying a stereoscopic image on a display panel of a smart phone and installing the smart phone in the HMD a user wears has been recently developed, so as to implement virtual reality using the smart phone. However, because an optimum design of virtual reality is not applied to a display device of the smart phone, a method for displaying a virtual reality image using the smart phone cannot implement high-quality virtual reality.

A display panel of a personal immersive device may be divided into a left eye display panel and a right eye display panel. A power module integrated circuit (PMIC) generating electric power required to drive the two display panels is necessary to simultaneously drive the two display panels of the personal immersive device. A driver integrated circuit (IC) is connected to each of the two display panels.

When one PMIC generates electric power required to drive one display panel, two PMICs are necessary in the personal immersive device. In this instance, a printed circuit board (PCB) becomes larger in size due to the two PMICs and peripheral circuits connected to the two PMICs, leading to an increase in cost. Further, when the two PMICs generate the electric power of the two display panels, enable signals generated in two driver ICs may not be synchronized with each other. Hence, the two display panels may sequentially emit light.

In order to generate driving power of two display panels using one PMIC, the driver ICs for respectively driving the display panels have to be connected to one PMIC. However, in this instance, a synchronization problem between the driver ICs and the PMIC may be generated. The synchronization problem may cause damage or a malfunction of the driver ICs and an abnormal drive of the display panels.

SUMMARY OF THE DISCLOSURE

The present disclosure provides a display device capable of driving a plurality of display panels using one power module integrated circuit to avoid a malfunction of driver integrated circuits or the display panels and a method of driving the display device.

In one aspect, there is provided a display device including a first driver integrated circuit configured to drive a first pixel array, a second driver integrated circuit configured to drive a second pixel array, a power module integrated circuit configured to receive an enable signal and output a driving voltage, and an AND logic circuit that receives an output of the first driver integrated circuit and an output of the second driver integrated circuit and output the enable signal.

In one embodiment, the AND logic circuit includes a first AND gate structure that is configured to receive an output signal output from a first output terminal of the first driver integrated circuit and an output signal output from a first output terminal of the second driver integrated circuit and output a first enable signal, and a second AND gate configured to receive an output signal output from a second output terminal of the first driver integrated circuit and an output signal output from a second output terminal of the second driver integrated circuit and output a second enable signal. Each of the output signals output through the first and second output terminals includes a plurality of pulses.

The power module integrated circuit outputs a first driving voltage in response to the first enable signal and commonly supplies the first driving voltage to the first and second driver integrated circuits. The power module integrated circuit outputs a second driving voltage in response to the second enable signal and commonly supplies the second driving voltage to the first and second driver integrated circuits.

The power module integrated circuit directly receives the output signals output through the first and second output terminals of one of the first and second driver integrated circuits.

The power module integrated circuit includes a first step-up converter configured to adjust the first driving voltage depending on a number of pulses of the output signal output through the first output terminal, and a second step-up converter configured to adjust the second driving voltage depending on a number of pulses of the output signal output through the second output terminal.

In another aspect, there is provided a method of driving a display device including a first driver integrated circuit driving a first pixel array, a second driver integrated circuit driving a second pixel array, and a power module integrated circuit connected to the first and second driver integrated circuits, the method including synchronizing an output of the first driver integrated circuit with an output of the second driver integrated circuit using an AND logic circuit function to supply the synchronized outputs of the first and second driver integrated circuits to the power module integrated circuit, A driving voltage is output from the power module integrated circuit in response to an output of the AND logic circuit, and supplying the driving voltage to the first and second driver integrated circuits.

BRIEF DESCRIPTION OF THE DRAWINGS

The accompanying drawings, which are included to provide a further understanding of the disclosure and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. A detailed description of known technology will be omitted if it is not need to further understand the embodiments of the invention.

Figure 1:
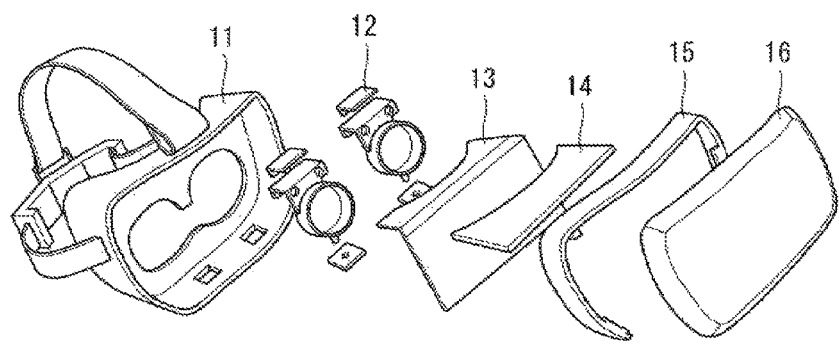
FIG. 1 is an exploded perspective view showing a personal immersive device according to an embodiment of the invention.

Referring to FIG. 1, a personal immersive device according to an embodiment of the invention includes a lens module 12, a display module 13, a main board 14, a headgear 11, a side frame 15, a front cover 16, and the like.

Figure 14:
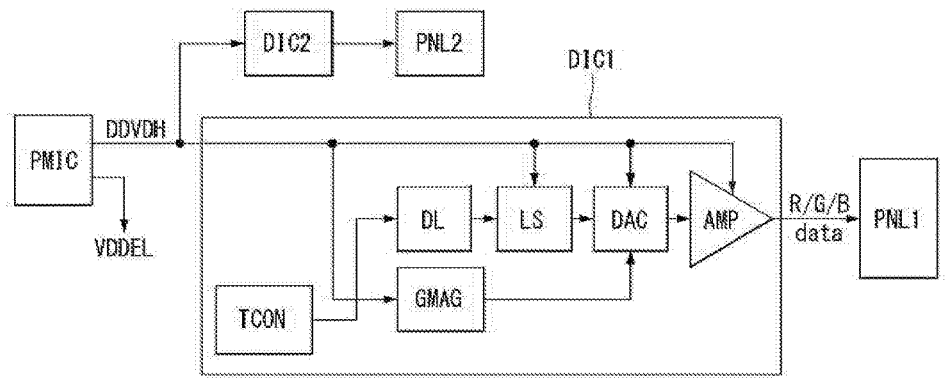
FIG. 14 illustrates a block diagram of a display device of a personal immersive device according to an embodiment of the invention.

The display module 13 includes a display panel driving circuit for driving each of two display panels and displays an input image received from the main board 14. The display panels include a first display panel a user watches with his or her left eye and a second display panel the user watches with his/her right eye. A power module integrated circuit (PMIC) is mounted on a printed circuit board (PCB) of the display module 13. The PMIC generates electric power required to drive the two display panels, as shown in FIG. 14. The display module 13 displays image data received from the main board 14 on the display panels. The image data may be two-dimensional (2D) or three-dimensional (3D) image data implementing virtual reality (VR) video images or augmented reality (AR) video images. The display module 13 may display various information received from the main board 14 as texts, symbols, etc.

The lens module 12 includes super-wide-angle lenses (i.e., a pair of fisheye lenses) for widening an angle of view between the user's left and right eyes. The pair of fisheye lenses include a left eye lens disposed in front of the first display panel and a right eye lens disposed in front of the second display panel.

The main board 14 includes a host system processor that executes virtual reality software and supplies a left eye image and a right eye image to the display module 13. The host system processor is connected to an external input device, various sensors, a communication module, a display module, etc. The host system processor controls various function of a personal immersive device. The host system processor may be an application processor (AP). The application processor may transmit a video signal of an input image to the display module 13 through a mobile industry processor interface (MIPI). An interface module is connected to an external device through an interface such as universal serial bus (USB) and high definition multimedia interface (HDMI). The sensors include a gyro sensor, an acceleration sensor, and the like. The host system processor of the main board 14 corrects left eye image data and right eye image data in response to an output signal of the sensor module and transmits left eye image data and right eye image data of an input image received through the interface module to the display module 13. The host system processor may produce a left eye image and a right eye image suitable for a resolution of the display panel based on the result of an analysis of depth information of a 2D image and may transmit the left eye image and the right eye image to the display module 13.

The headgear 11 includes a back cover exposing the fisheye lenses and a band connected to the back cover. The back cover of the headgear 11, the side frame 15, and the front cover 16 are assembled to secure an inner space, in which components of the personal immersive device are disposed, and to protect the components. The components include the lens module 12, the display module 13, and the main board 14. The band is connected to the back cover. The user wears the personal immersive device on his/her head using the band. When the user wears the personal immersive device on his/her head, he/she watches the different display panels (i.e., the first and second display panels) with his/her left and light eyes through the fisheye lenses.

The side frame 15 is fixed between the headgear 11 and the front cover 16 and secures a gap of the inner space, in which the lens module 12, the display module 13, and the main board 14 are disposed. The front cover 16 is disposed at a front surface of the personal immersive device.

The personal immersive device according to the embodiment of the invention may be implemented as a head mounted display (HMD) shown in FIG. 1, but is not limited thereto. For example, the embodiment of the invention may be implemented as an eye glasses-type display (EGD). Reference herein to the embodiment of the invention includes one or more of the various embodiments and is not limited to just a single embodiment. Since various different embodiments are disclosed, use of the term the embodiment in not restrict to just a single one, but includes them all, as the context permits.

Figure 2:
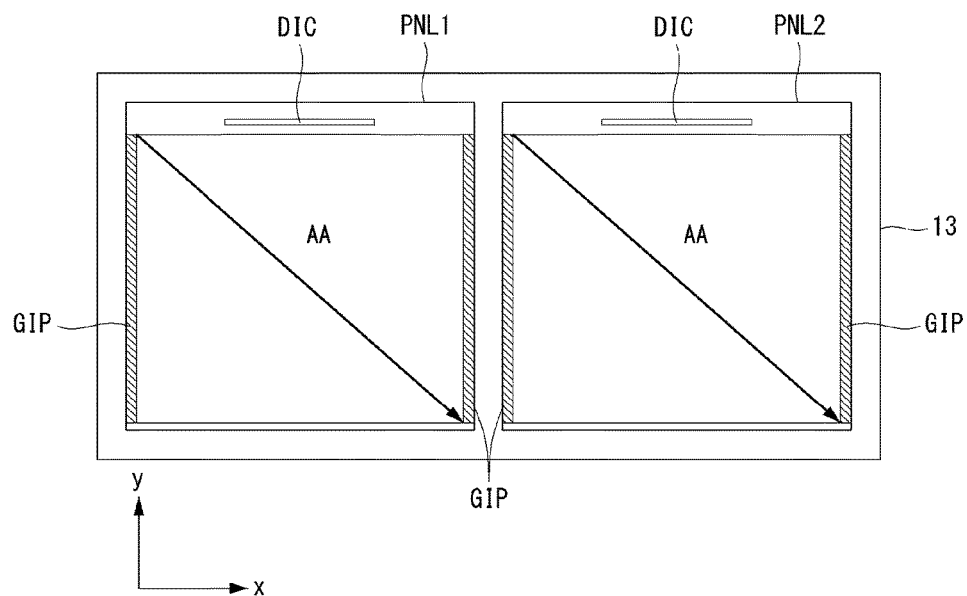
FIG. 2 shows first and second display panels of a display module shown in FIG. 1.
Figure 3:
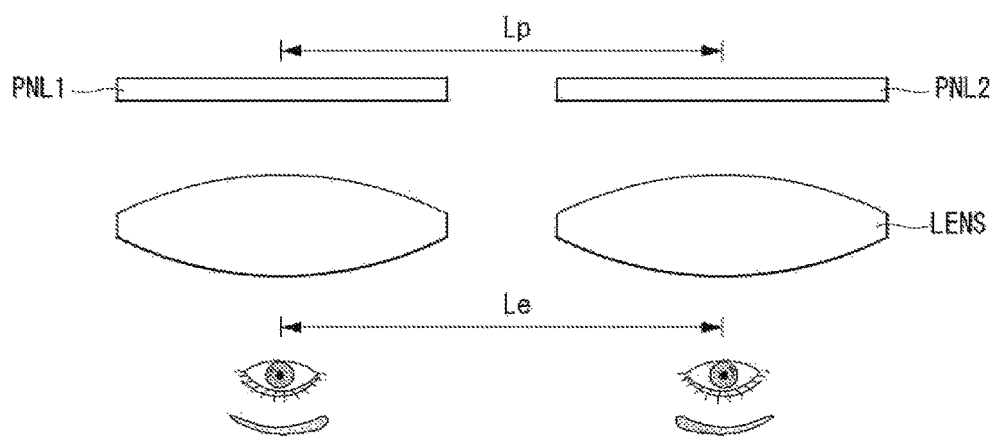
FIG. 3 illustrates a distance between first and second display panels shown in FIG. 2.

FIG. 2 shows first and second display panels PNL1 and PNL2 of the display module 13 shown in FIG. 1. FIG. 3 illustrates a distance between the first and second display panels PNL1 and PNL2 shown in FIG. 2. Each of the first and second display panels PNL1 and PNL2 is implemented as an organic light emitting diode (OLED) display panel having a fast response time, excellent color reproduction characteristic, and excellent viewing angle characteristic. In case of the EGD, the first and second display panels PNL1 and PNL2 may be implemented as a transparent OLED display panel.

Figure 7:
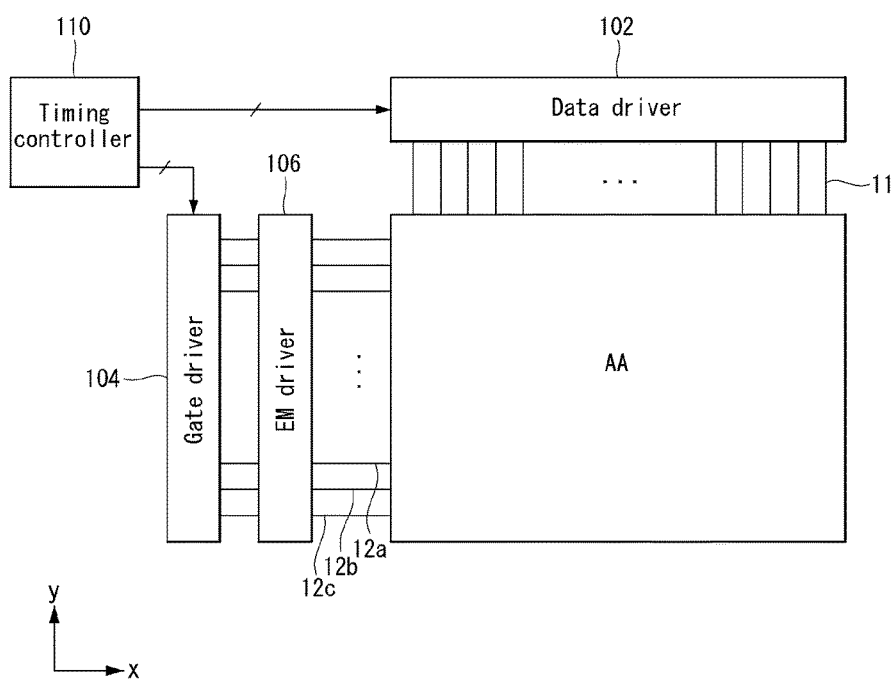
FIG. 7 is a block diagram showing configuration of a display panel shown in FIG. 2.

Referring to FIGS. 2 and 3, the first and second display panels PNL1 and PNL2 are separately manufactured and are disposed to be separated from each other on the display module 13. At least a portion of a display panel driving circuit may be disposed between the first and second display panels PNL1 and PNL2. In FIG. 2, "DIC (drive integrated circuit)" is an integrated circuit (IC) chip, into which a timing controller 110 and a data driver 102 shown in FIG. 7 are integrated. GIP (gate-in panel)" is a circuit, into which a gate driver 104 and an emission (abbreviated to "EM") driver 106 shown in FIG. 7 and a pixel array are integrated on the same substrate.

A distance Lp between a center of a pixel array AA of the first display panel PNL1 and a center of a pixel array AA of the second display panel PNL2 may be substantially the same as a distance Le between both eyes of the user. The distance Lp between the center of the pixel array AA of the first display panel PNL1 and the center of the pixel array AA of the second display panel PNL2 may be set to Le±α. The distance Le between both eyes of the user is a distance between a pupil of the left eye and a pupil of the right eye and is about 6.5 cm (=65 mm). The distance Le may slightly vary depending on races. "α" is a margin designed in consideration of the display panel driving circuit (for example, GIP of FIG. 2) disposed between the first and second display panels PNL1 and PNL2, a process deviation, etc. and may be set to 10% of Le.

The pixel array AA of each of the first and second display panels PNL1 and PNL2 has a landscape type aspect ratio, in which a length in a horizontal direction x is longer than a length in a vertical direction y, in consideration of a vertical viewing angle and a horizontal viewing angle. In the personal immersive device, an improvement effect of the viewing angle when increasing the horizontal viewing angle is greater than an improvement effect of the viewing angle when increasing the vertical viewing angle. The embodiment of the invention manufactures each of the first and second display panels PNL1 and PNL2 as a landscape type OLED display panel, so as to maximize the horizontal viewing angle in the personal immersive device.

In the landscape type aspect ratio, the number of pixels in the horizontal direction x is more than the number of pixels in the vertical direction y, and the length in the horizontal direction x is longer than the length in the vertical direction y. Further, in a portrait type aspect ratio, the number of pixels in the vertical direction y is more than the number of pixels in the horizontal direction x, and a length in the vertical direction y is longer than a length in the horizontal direction x.

The present inventors conducted an experiment on a stereoscopic feeling, an immersion, and a fatigue the user feels while changing types of the display panel of the personal immersive device. According to the result of the experiment, as shown in FIG. 3, when the pixel arrays of the first and second display panels PNL1 and PNL2 were separated from each other by the distance between both eyes of the user, the present inventors confirmed that the stereoscopic feeling the user feels was greatly improved. Namely, the impression of the user that he is in a stereoscopic, true 3D environment is improved. When the pixel arrays of the first and second display panels PNL1 and PNL2 are separated from each other and the distance between the centers of the pixel arrays of the first and second display panels PNL1 and PNL2 is the same as the distance between the left eye and the right eye of the user, the viewing angle widens and a large improvement effect of the stereoscopic feeling is obtained. In the personal immersive device according to the embodiment of the invention, the pupil of the user's left eye corresponds to the center of the pixel array AA of the first display panel PNL1, and the pupil of the user's right eye corresponds to the center of the pixel array AA of the second display panel PNL2.

The stereoscopic feeling the user feels is better in the landscape type aspect ratio than the portrait type aspect ratio. The embodiment of the invention can improve the stereoscopic feeling by separately disposing a landscape type display panel for left eye and a landscape type display panel for right eye at the personal immersive device.

The first and second pixel arrays AA may be respectively disposed on separate substrates, so that the first pixel array AA, on which the left eye image is displayed, and the second pixel array AA, on which the right eye image is displayed, are separate from each other. In this instance, the first pixel array AA is disposed on a substrate of the first display panel PNL1, and the second pixel array AA is disposed on a substrate of the second display panel PNL2.

In another embodiment, the first and second pixel arrays may be separated from each other on one substrate. In this instance, the first and second pixel arrays may be separated from each other on one display panel. In the embodiment disclosed herein, the fact that the first and second pixel arrays are separated from each other indicates that data lines, gate lines (or scan lines), and pixels of the first and second pixel arrays are separated from each other. Because the first and second pixel arrays AA are separated from each other but may be driven through the same driving signal system, the first and second pixel arrays AA may share at least a portion of the display panel driving circuit with each other.

When the two pixel arrays AA are separately disposed on one substrate, this configuration may provide various effects in addition to the improvement of the stereoscopic feeling. A related art VR device forms one pixel array on one substrate and displays a left eye image and a right eye image on the one pixel array. Namely, the related art VR device does not divide the pixel array into separate portions. Unlike the related art, the embodiment of the invention divides the display panel into the two display panels PNL1 and PNL2 and divides the pixel array AA into the two pixel arrays, or separately disposes the two pixel arrays on one substrate. Thus, there is a difference between the embodiment of the invention and the related art in whether or not the pixel array is divided. The embodiment of the invention can dispose the pixel arrays AA more freely than the related art because of the difference and can dispose the pixel arrays AA respectively corresponding to the left eye and the right eye of people in an optimum ratio of the viewing angle, thereby maximizing the stereoscopic feeling.

Because the structure of the display panel according to the embodiment of the invention reduces the area of the pixel array in terms of the productivity, the embodiment of the invention can reduce a defective percentage and increase the yield.

When a distance between the pixel arrays AA decreases, the screen size decreases. Therefore, a display image becomes narrow. On the contrary, when the distance between the pixel arrays AA increases, the centers of the pixel arrays corresponding to both eyes of the user move to the outside of the screen. Hence, the immersion and the stereoscopic feeling may be reduced. When the distance between both eyes of the user is 65 mm and the centers of the separated pixel arrays AA accurately correspond to the pupils of both eyes of the user, the user wearing the personal immersive device can perceive a stereoscopic image while feeling the maximum stereoscopic feeling. When the distance between the pixel arrays AA excessively decreases or increases, the viewing angle may be optically compensated for using the fisheye lens, or the distance between the left eye image and the right eye image may be adjusted based on the distance between the both eyes of the user through the image processing. However, the method leads to a reduction of the display efficiency in terms of viewing angle. In other words, when the pixel arrays are separately disposed and the centers of the pixel arrays accurately correspond to the pupils of the left and right eyes of the user as in the embodiment of the invention, the user can watch the most accurate stereoscopic image.

In the personal immersive device, the fisheye lens exists between the user's eye and the display panel, and a distance between the user's eye and the display panel is as short as several centimeters. When the user watches an image reproduced on the display panels PNL1 and PNL2 through the fisheye lenses, the user watches an image which is four to five times larger than the size of a real screen displayed on the display panels PNL1 and PNL2. When a resolution of the display panel is reduced in an environment where it is visible to the user's eyes in the proximity of the display panel and the fisheye lens is applied, a non-emission area of the pixels increases. Hence, a screen door effect increases, and immersion is reduced. The pixel array of each of the first and second display panels PNL1 and PNL2 has a resolution equal to or greater than QHD (quad high definition) resolution (1440×1280), a pixel density equal to or greater than 500 ppi (pixels per inch), and a pixel aperture ratio equal to or greater than 14%, so as to increase the immersion of the personal immersive device. In the QHD resolution 1440× 1280, "1440" is the number (i.e., a horizontal resolution) of pixels of the pixel array in the horizontal direction x, and "1280" is the number (i.e., a vertical resolution) of pixels of the pixel array in the vertical direction y. The pixel array AA may have a pixel density of 500 ppi to 600 ppi and a pixel aperture ratio of 14% to 20%, considering a technology level of the producible OLED display panels.

When the personal immersive device displays a 3D motion picture, an increase in a total latency may lead to screen retention or motion blur. The screen retention or the motion blur of the 3D motion picture reduces the quality of the 3D motion picture and also increases a fatigue of the user. The total latency is a system processing time required to process data through the main board 14, added to a time to transmit the data to the display module 13, and added to a delay time of the display module 13. The delay time of the display module 13 is a frame delay time, at which an input image is delayed during one frame period, added to a response time of the pixels.

The embodiment of the invention reduces the fatigue of the user by reducing the response time of the pixels and increasing a frame rate (or a refresh rate) when the personal immersive device displays the 3D motion picture. To this end, the embodiment of the invention manufactures switching elements and driving elements of the pixels of each of the display panels PNL1 and PNL2 as an n-type metal oxide semiconductor field effect transistor (MOSFET). Hence, the embodiment of the invention reduces a response time of a pixel circuit to 2 msec and increases the frame rate to a value equal to or greater than 90 Hz, shortening a data update cycle. When the frame rate is 90 Hz, the data update cycle (i.e., one frame period) is approximately 11.1 ms. Thus, the embodiment of the invention reduces the delay time of the display module 13 of the personal immersive device to about 13 msec and can reduce the total latency to a level equal to or less than 25 ms. Data of the input image is addressed to the pixels through the data update cycle.

Figure 4:
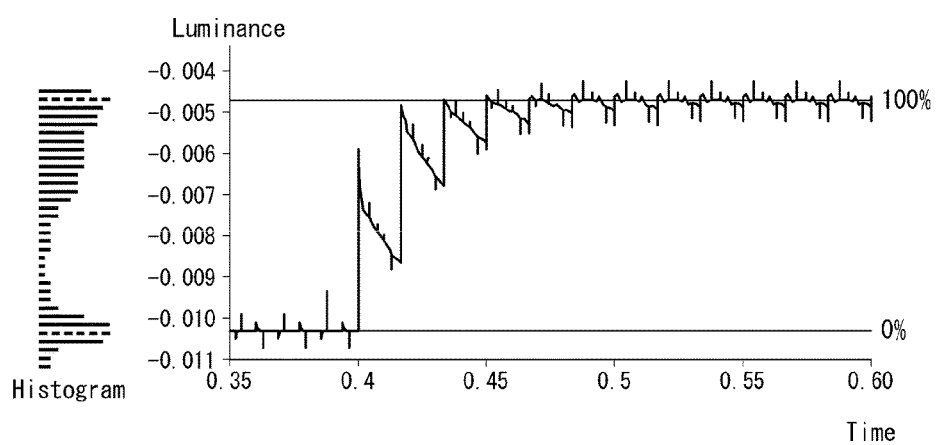
FIGS. 4 to 6 illustrate a result of measurement of a response time according to an embodiment of the invention.
Figure 5:
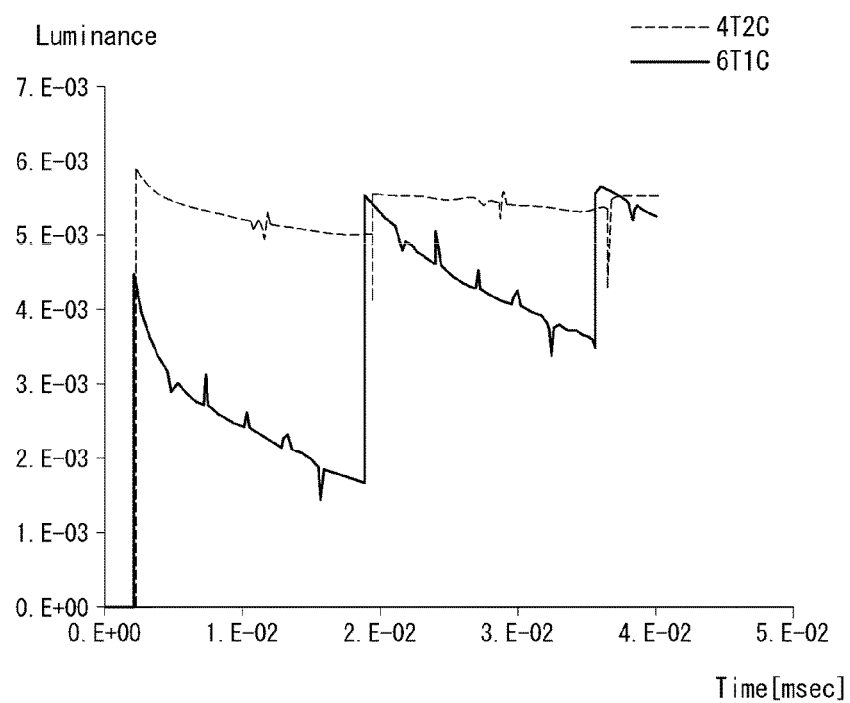
Figure 6:
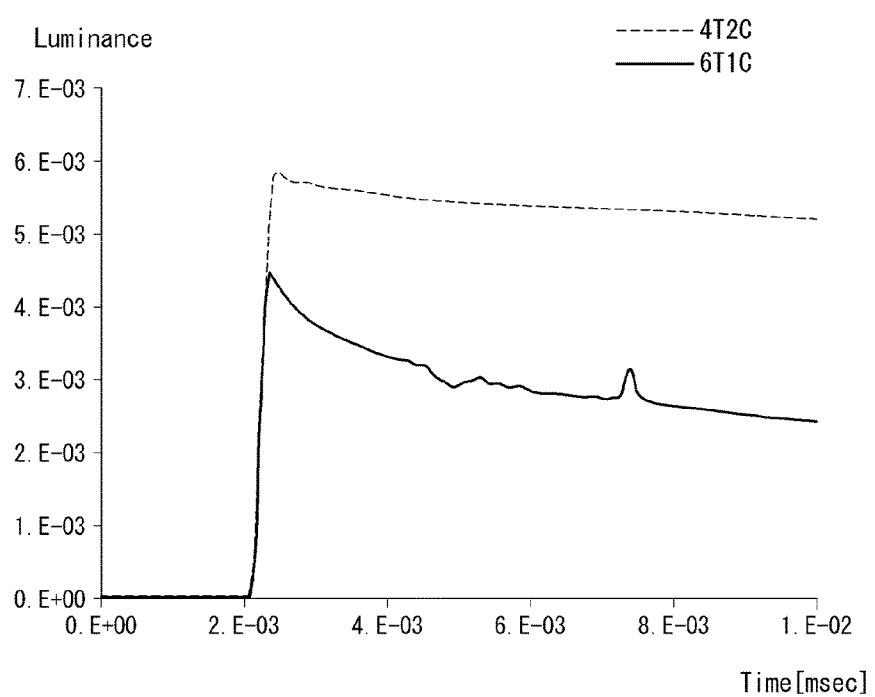

FIGS. 4 to 6 illustrate a result of measurement of a response time according to the embodiment of the invention. In FIGS. 4 to 6, x-axis is time (msec), and y-axis is a relative value of a luminance measured using a luminance meter. FIG. 6 is an enlarged view of a rising section of measured luminances of FIG. 5. In FIGS. 5 and 6, "4T2C" represented by the dotted line indicates a response time of a pixel circuit (see FIG. 9) including four n-type MOSFETs and two capacitors, and "6T1C" represented by the solid line indicates a response time of a pixel circuit (not shown) including six n-type MOSFETs and one capacitor.

Examples of a method for measuring the response time include a B-to-W (black to white) method and a G-to-G (gray to gray) method. The B-to-W method measures time required to change from a black pixel to a white pixel. In case of a liquid crystal display, the B-to-W method measures time required to change from a completely opened state of liquid crystals to a completely closed state of the liquid crystals or time required to change from a completely closed state of liquid crystals to a completely opened state of the liquid crystals.

The G-to-G method measures a response time between bright gray close to white and dark gray close to black. When a white luminance is generally regarded as 100%, the G-to-G method measures time required to reach a luminance of 90% from a luminance of 10%.

The method for measuring the response time according to the embodiment of the invention used the G-to-G method. The method for measuring the response time according to the embodiment of the invention measures a luminance on the screen while displaying a black image on the screen for a predetermined time (e.g., for 500 ms), then displaying a white image on the screen for a predetermined time, and then again displaying the black image on the screen for a predetermined time. The method for measuring the response time according to the embodiment of the invention makes a histogram representing luminances measured using the luminance meter. The dotted line of the lower part of the histogram of FIG. 4 is the most frequently measured black luminance, and is considered to be a reference black luminance (=0%). The dotted line of the upper part of FIG. 4 is the most frequently measured white luminance, and is considered to be a reference white luminance (=100%). The method for measuring the response time according to the embodiment of the invention measures a change from 10% to 90% of the reference white luminance (=100%) as a rising time and measures a change from 90% to 10% of the reference white luminance (=100%) as a falling time. The response time according to the embodiment of the invention is measured as a sum of the rising time and the falling time. Thus, the response time according to the embodiment of the invention is measured as a sum of a response time required in a rise from 10% to 90% of the reference white luminance (=100%) and a response time required in a fall from 90% to 10% of the reference white luminance (=100%).

An embodiment of the invention has a response time, which is greater than zero and is equal to or less than 2 ms, measured through the above-described method using the display panel implementing the pixel array using the pixel circuit 4T2C including the n-type MOSFETs.

As can be seen from FIGS. 5 and 6, the pixel circuit using the n-type MOSFET rapidly increases a luminance of the pixel to a luminance equal to or greater than 90% of a target luminance within 2 msec at a frame rate of 60 Hz. Thus, the pixel circuit 4T2C using the n-type MOSFETs has a response time of 2 msec or less which is much shorter than one frame period (about 16.67 ms). On the other hand, the pixel circuit 6T1C using p-type MOSFETs may increase a luminance of the pixel to a luminance equal to or greater than 90% of a target luminance at a frame rate of 60 Hz after time equal to or greater than two frame periods (about (16.67×2) ms) passed. Therefore, in a 6T1C pixel using p-type MOSFETs, a response time is equal to or greater than two frame periods.

The embodiment of the invention duty-drives each of the display panels PNL1 and PNL2 and controls a duty ratio of the pixels to a value equal to or less than 50% when the personal immersive device displays the 3D motion picture. Hence, the embodiment of the invention can further reduce the fatigue of the user using a black data insertion (BDI) effect. The duty ratio of the pixels is a percentage of an emission time of the pixels with respect to a given emission time. For example, the fact that the pixels emit light at a duty ratio equal to or less than 50% when a given emission time is one frame period means that the pixels emit light for time equal to or less than one half of one frame period. The duty-drive of the pixels can obtain an improvement of the motion blur and a reduction in an image persistence time using the BDI effect and can prevent the image retention and a flicker. Further, the duty-drive of the pixels can reduce the fatigue of the user watching the 3D motion picture by reducing an amount of current of the pixel at a low gray level.

Figure 8:
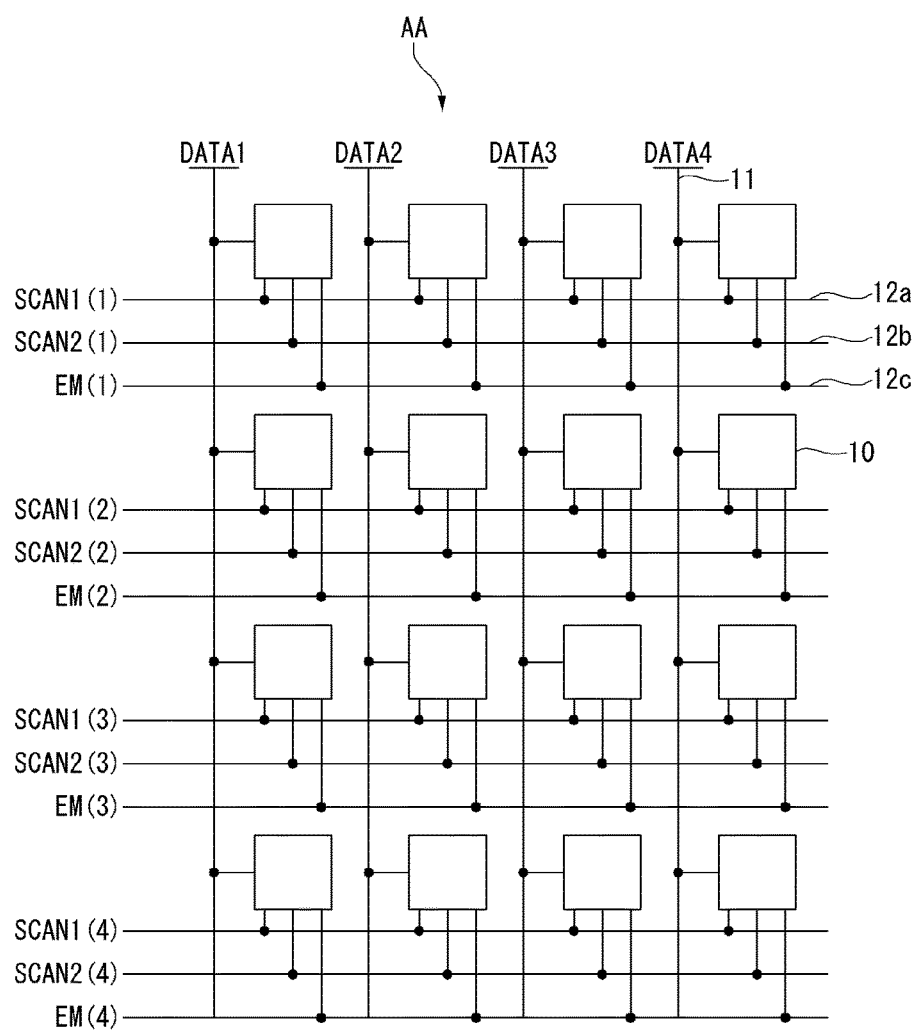
FIG. 8 schematically illustrates a portion of a pixel array shown in FIG. 7.
Figure 9:
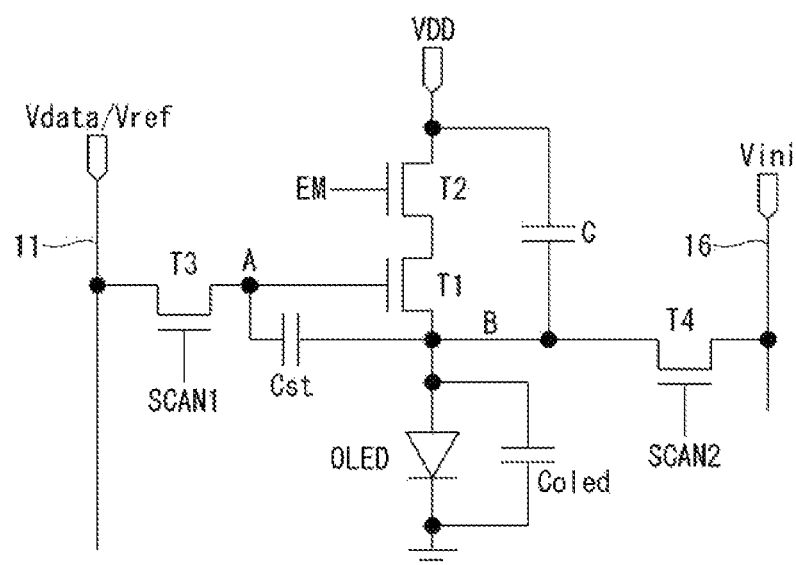
FIG. 9 is an equivalent circuit diagram showing an example of a pixel circuit.
Figure 10:
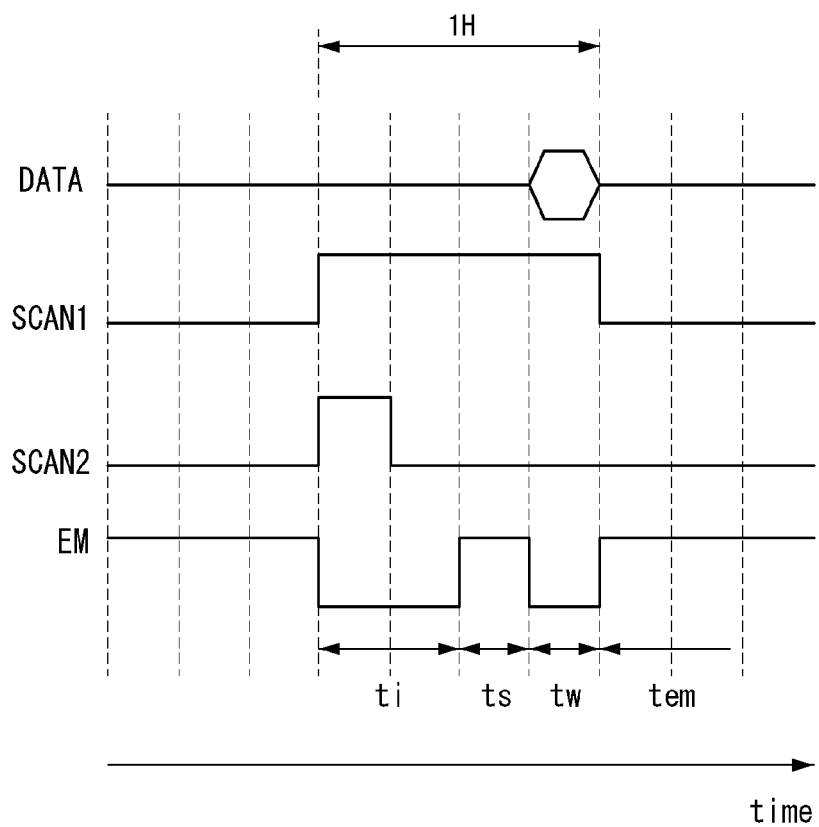
FIG. 10 is a waveform diagram illustrating signals input to a pixel shown in FIG. 9.

FIG. 7 is a block diagram showing configuration of the display panel shown in FIG. 2. FIG. 8 schematically illustrates a portion of a pixel array shown in FIG. 7. FIG. 9 is an equivalent circuit diagram showing an example of a pixel circuit. FIG. 10 is a waveform diagram illustrating signals input to a pixel shown in FIG. 9.

Referring to FIGS. 7 to 10, each of the first and second display panels PNL1 and PNL2 according to the embodiment of the invention includes the pixel array AA displaying an input image and the display panel driving circuit for writing data of the input image on the pixel array AA. The display panel driving circuit includes a data driver 102, a gate driver 104, an emission (abbreviated to "EM") driver 106, and a timing controller 110. The display panel driving circuit further includes a power circuit (not shown). The power circuit generates electric power required to drive the data driver 102, the gate driver 104, the EM driver 106, the timing controller 110, and the display panels PNL1 and PNL2.

At least a portion of the display panel driving circuit may be disposed on the surface of a substrate between the first and second pixel arrays AA. The first and second display panels PNL1 and PNL2 may share at least a portion (for example, the timing controller 110 of FIG. 7) of the display panel driving circuit with each other. The display panel driving circuit addresses data to pixels 10 of the display panels PNL1 and PNL2 at a high frame rate equal to or greater than 90 Hz and writes the data on the pixels 10.

A plurality of data lines 11 and a plurality of gate lines 12a, 12b, and 12c cross each other on the pixel array AA, and the pixels 10 are arranged in a matrix form. The pixel array AA includes a reference voltage line (hereinafter referred to as "REF line") 16 commonly connected to the pixels 10 and a VDD line (not shown) used to supply a high potential driving voltage VDDEL to the pixels 10. A predetermined initialization voltage Vini may be supplied to the pixels 10 through the REF line 16.

The gate lines 12a, 12b, and 12c include a plurality of first scan lines 12a supplied with a first scan pulse SCAN1, a plurality of second scan lines 12b supplied with a second scan pulse SCAN2, and a plurality of EM signal lines 12c supplied with an EM signal EM.

Each pixel 10 includes a red subpixel, a green subpixel, and a blue subpixel for color representation. Each pixel 10 may further include a white subpixel. One data line 11, the gate lines 12a, 12b, and 12c, the REF line 16, the VDD line, etc. are connected to each pixel 10.

One frame period is divided into a scanning period, in which data is addressed to the pixels 10 and data of the input image is written on each pixel 10, and a duty driving period, in which the pixels 10 emit light at a predetermined duty ratio in response to the AC EM signal EM after the scanning period. The AC EM signal EM is generated at a duty ratio equal to or less than 50% during the duty driving period and causes the pixels 10 to emit light at the duty ratio equal to or less than 50%. Because the scanning period is about one horizontal period, the duty driving period occupies most of one frame period. Capacitors of the pixels 10 are charged with a data voltage during the scanning period. The pixels 10 repeatedly perform an emission operation (or a turn-on operation) and a non-emission operation (or a turn-off operation) in response to the AC EM signal EM. Light emission of the pixels are thus switched on and off depending on a stage of the EM signal EM. Each pixel 10 repeatedly performs the turn-on operation and the turn-off operation during one frame period and emits light at the duty ratio equal to or less than 50%. The pixels 10 are turned off and then emit light using the data voltage charged to the capacitors. Therefore, during the duty driving period following the scanning period, the pixels 10 are not additionally supplied with the data voltage and are driven at the duty ratio equal to or less than 50%. Hence, data is displayed at the same luminance during one frame period.

The data driver 102 converts data DATA of the input image received from the timing controller 110 into a gamma compensation voltage under the control of the timing controller 110 and generates the data voltage. The data driver 102 outputs the data voltage to the data lines 11. The data driver 102 may output a predetermined reference voltage Vref to the data lines 11 during an initialization period ti, so as to initialize the driving elements of the pixels 10.

The gate driver 104 supplies the first and second scan pulses SCAN1 and SCAN2 to the first and second scan lines 12a and 12b under the control of the timing controller 110. The first and second scan pulses SCAN1 and SCAN2 are synchronized with the data voltage. When the data voltage is supplied to the pixels, the first scan pulse SCAN1 maintains an on-level and turns on a switching element T3, thereby selecting the pixels 10 to be charged with the data voltage. The second scan pulse SCAN2 rises at the same time as the first scan pulse SCAN1 and falls earlier than the first scan pulse SCAN1, thereby initializing the pixels 10 during the initialization period ti. The second scan pulse SCAN2 rises at the same time as the first scan pulse SCAN1 and falls before a sampling period ts.

The gate driver 104 shifts the scan pulses SCAN1 and SCAN2 using a shift register and sequentially supplies the scan pulses SCAN1 and SCAN2 to the scan lines 12a and 12b. The shift register of the gate driver 104 may be directly formed on the substrate of the display panel along with the pixel array AA through a gate-in panel (GIP) process.

The EM driver 106 is a duty driver that outputs the EM signal EM under the control of the timing controller 110 and supplies the EM signal EM to the EM signal lines 12c. The EM driver 106 shifts the EM signal EM using a shift register and sequentially supplies the EM signal EM to the EM signal lines 12c. The EM driver 106 repeatedly toggles the EM signal EM during the duty driving period under the control of the timing controller 110 and drives the pixels 10 at a duty ratio equal to or less than 50%. The shift register of the EM driver 106 may be directly formed on the substrate of the display panel along with the pixel array AA through the GIP process.

The timing controller 110 receives digital video data DATA of the left eye image and the right eye image received from the main board 14 and a timing signal synchronized with the digital video data DATA. The timing signal includes a vertical sync signal Vsync, a horizontal sync signal Hsync, a clock signal CLK and a data enable signal DE. The timing controller 110 generates a data timing control signal for controlling operation timing of the data driver 102, a gate timing control signal for controlling operation timing of the gate driver 104, and a duty timing control signal for controlling operation timing of the EM driver 106 based on the timing signal received from the main board 14 and a predetermined register setting value of display command set (DCS). The timing controller 110 controls a duty ratio of the EM signal EM using the duty timing control signal.

As shown in FIG. 9, each pixel 10 includes an OLED, a plurality of thin film transistors (TFTs) T1 to T4, and a storage capacitor Cst. A capacitor C may be connected between a drain of the second TFT T2 and a second node B. In FIG. 9, "Coled" denotes a parasitic capacitance of the OLED. The TFTs are implemented as the n-type MOSFET. During the scanning period, the pixels 10 sample a threshold voltage of the driving TFT T1 and are supplied with the data voltage of the input image. During a duty driving period tem, the pixels 10 emit light at a duty ratio equal to or less than 50%. The scanning period is divided into the initialization period ti, in which the pixels 10 are initialized, the sampling period ts, in which the threshold voltage of the driving element of each pixel 10 is sampled, and a programming period tw, in which the data voltage of the input image is supplied to the pixels 10.

The OLED emits light using an amount of current controlled by the first TFT T1 depending on the data voltage output from the data driver 102. A current path of the OLED is switched by the second TFT T2. The OLED includes an organic compound layer formed between an anode and a cathode. The organic compound layer may include a hole injection layer HIL, a hole transport layer HTL, an emission layer EML, an electron transport layer ETL, and an electron injection layer EIL, but is not limited thereto. The anode of the OLED is connected to the second node B, and the cathode of the OLED is connected to a VSS electrode, to which a low potential power voltage or a ground level voltage VSS is applied. "Coled" denotes a parasitic capacitance formed between the anode and the cathode of the OLED.

The first TFT T1 is a driving element adjusting a current flowing in the OLED depending on a gate-to-source voltage Vgs. The first TFT T1 includes a gate connected to a first node A, a drain connected to a source of the second TFT T2, and a source connected to the second node B.

The second TFT T2 is a switching element switching a current flowing in the OLED on and off in response to the EM signal EM. The EM signal EM is generated at an on-level during the sampling period ts and repeats the on-level and an off-level during the duty driving period. Hence, the EM signal EM is generated at a duty ratio equal to or less than 50%. The drain of the second TFT T2 is connected to the VDD line supplied with the high potential driving voltage VDDEL, and the source of the second TFT T2 is connected to the drain of the first TFT T1. A gate of the second TFT T2 is connected to the EM signal line 12c and is supplied with the EM signal EM. The EM signal EM is generated at the on-level (or a high logic level) during the sampling period ts and turns on the second TFT T2. The EM signal EM is inverted to the off-level (or a low logic level) during the initialization period ti and the programming period tw and turns off the second TFT T2. The EM signal EM repeats the on-level and the off-level depending on a pulse width modulation (PWM) duty ratio and is generated at a duty ratio equal to or less than 50% during the duty driving period tem. The OLED emits light at a duty ratio equal to or less than 50% due to the second TFT T2 switching in response to the EM signal EM.

The third TFT T3 is a switching element supplying the data voltage Vdata to the first node A in response to the first scan pulse SCAN1. The third TFT T3 includes a gate connected to the first scan line 12a, a drain connected to the data line 11, and a source connected to the first node A. The first scan pulse SCAN1 is supplied to the pixels 10 through the first scan line 12a. The first scan pulse SCAN1 is generated at an on-level during about one horizontal period 1H and turns on the third TFT T3. The first scan pulse SCAN1 is inverted to an off-level during the duty driving period tem and turns off the third TFT T3.

The fourth TFT T4 is a switching element supplying the reference voltage Vref to the second node B in response to the second scan pulse SCAN2. The fourth TFT T4 includes a gate connected to the second scan line 12b, a drain connected to the REF line 16, and a source connected to the second node B. The second scan pulse SCAN2 is supplied to the pixels 10 through the second scan line 12b. The second scan pulse SCAN2 is generated at an on-level during the initialization period ti and turns on the fourth TFT T4. The second scan pulse SCAN2 maintains an off-level during the remaining period and controls the fourth TFT T4 in an Off-state.

The storage capacitor Cst is connected between the first node A and the second node B and stores a difference voltage between the first node A and the second node B, thereby holding the gate-to-source voltage Vgs of the first TFT T1. The storage capacitor Cst samples a threshold voltage Vth of the driving element, i.e., the first TFT T1 in a source follower manner. The capacitor C is connected between the VDD line and the second node B. When a voltage of the first node A changes depending on the data voltage Vdata scanned during the programming period tw, the capacitors Cst and C divide a change amount of the voltage of the first node A and reflect the divided voltage on a voltage of the second node B.

The scanning period of the pixel 10 is divided into the initialization period ti, the sampling period ts, and the programming period tw, as shown in FIG. 10. The scanning period is set to about one horizontal period 1H, and data is written on the pixels 10 arranged on one horizontal line of the pixel array during the scanning period. During the scanning period, the threshold voltage Vth of the driving element, i.e., the first TFT T1 of the pixel 10 is sampled, and the data voltage is compensated by an amount of the threshold voltage Vth. Thus, during one horizontal period 1H, data DATA of the input image is compensated by an amount of the threshold voltage Vth of the driving element T1 and is written on the pixel 10.

When the initialization period ti starts, the first and second scan pulses SCAN1 and SCAN2 rise and are generated at the on-level. And at the same time, the EM signal EM falls and changes to the off-level. During the initialization period ti, the second TFT T2 is turned off and blocks a current path of the OLED. During the initialization period ti, the third and fourth TFTs T3 and T4 are turned on. During the initialization period ti, the predetermined reference voltage Vref is supplied to the data line 11. During the initialization period ti, the voltage of the first node A is initialized to the reference voltage Vref, and the voltage of the second node B is initialized to the predetermined initialization voltage Vini. After the initialization period ti, the second scan pulse SCAN2 changes to the off-level and turns off the fourth TFT T4. The on-level is a voltage level of a gate voltage of the TFT that causes the switching elements T2 to T4 of the pixel 10 to be turned on. The off-level is a voltage level of the gate voltage of the TFT that causes the switching elements T2 to T4 of the pixel 10 to be turned off.

During the sampling period ts, the first scan pulse SCAN1 maintains the on-level, and the second scan pulse SCAN2 maintains the off-level. When the sampling period ts starts, the EM signal EM rises and changes to the on-level. During the sampling period ts, the second and third TFTs T2 and T3 are turned on. During the sampling period ts, the second TFT T2 is turned on in response to the EM signal EM of the on-level. During the sampling period ts, the third TFT T3 maintains the On-state due to the first scan pulse SCAN1 of the on-level. During the sampling period ts, the reference voltage Vref is supplied to the data line 11. During the sampling period ts, the voltage of the first node A is held at the reference voltage Vref, and the voltage of the second node B rises due to a drain-to-source current Ids. The gate-to-source voltage Vgs of the first TFT T1 is sampled as the threshold voltage Vth of the first TFT T1 through the source follower manner, and the sampled threshold voltage Vth is stored in the storage capacitor Cst. During the sampling period ts, the voltage of the first node A is the reference voltage Vref, and the voltage of the second node B is "Vref-Vth".

During the programming period tw, the third TFT T3 maintains the On-state in response to the first scan pulse SCAN1 of the on-level, and the remaining TFTs T1, T2, and T4 are turned off. During the programming period tw, the data voltage Vdata of the input image is supplied to the data line 11. The data voltage Vdata is applied to the first node A, and the result of voltage division between the capacitors Cst and C with respect to a change amount (Vdata-Vref) of the voltage of the first node A is reflected on the voltage of the second node B. Hence, the gate-to-source voltage Vgs of the first TFT T1 is programmed. During the programming period tw, the voltage of the first node A is the data voltage Vdata, and the voltage of the second node B is "Vref-Vth+ C'*(Vdata-Vref)" obtained by adding the result (C'*(Vdata-Vref)) of voltage division between the capacitors Cst and C to the voltage "Vref-Vth" set through the sampling period ts. As a result, the gate-to-source voltage Vgs of the first TFT T1 is programmed to "Vdata-Vref+Vth-C'*(Vdata-Vref)" through the programming period tw. In the embodiment disclosed herein, C' is Cst/(Cst+C).

When the duty driving period tem starts, the EM signal EM rises and again changes to the on-level. On the other hand, the first scan pulse SCAN1 falls and changes to the off-level. During the duty driving period tem, the second TFT T2 maintains the On-state and forms a current path of the OLED. During the duty driving period tem, the first TFT T1 controls an amount of current flowing in the OLED based on the data voltage Vdata.

The duty driving period tem ranges from after the programming period tw to the initialization period ti of a next frame period. The embodiment of the invention causes the pixels 10 not to successively emit light during the duty driving period tem and causes the pixels 10 to emit light at a duty ratio equal to or less than 50% through the switching of the EM signal EM. When the EM signal EM is generated at the on-level, the second TFT T2 is turned on and forms the current path of the OLED. During the duty driving period tem, a current Ioled controlled based on the gate-to-source voltage Vgs of the first TFT T1 flows in the OLED and causes the OLED to emit light. During the duty driving period tem, because the first and second scan pulses SCAN1 and SCAN2 maintain the off-level, the third and fourth TFTs T3 and T4 are turned off.

The current Ioled flowing in the OLED during the duty driving period tem is expressed by the following Equation 1. The OLED emits light by the current Ioled and represents brightness of the input image.

$$I_{oled} = \frac{k}{2}[(1-C')(V_{data}-V_{ref})]^2 \quad \text{[Equation 1]}$$

In the above Equation 1, k is a proportional constant determined by a mobility, a parasitic capacitance, a channel capacity, etc. of the first TFT T1.

Because the threshold voltage Vth of the first TFT T1 is included in the gate-to-source voltage Vgs of the first TFT T1 programmed through the programming period tw, Vth is cancelled in Ioled expressed in Equation 1. Thus, an influence of the threshold voltage Vth of the driving element, i.e., the first TFT T1 on the current Ioled of the OLED is removed.

Figure 11:
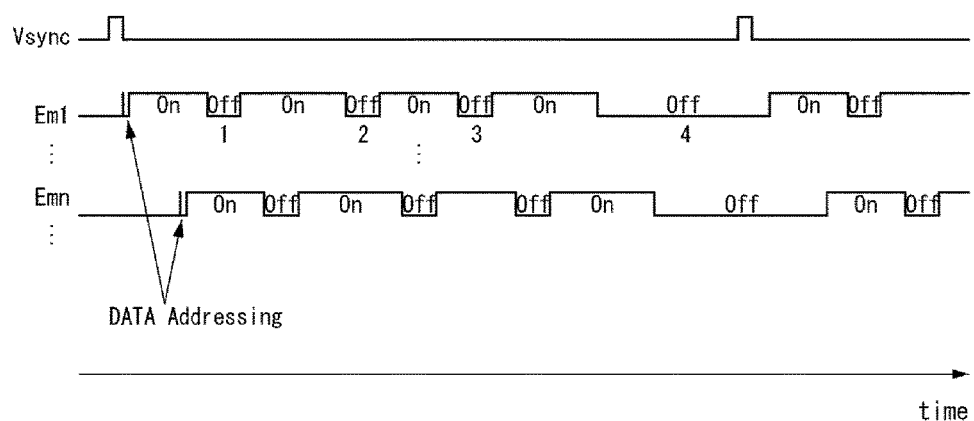
FIG. 11 is a waveform diagram illustrating a duty driving method of a pixel circuit according to an embodiment of the invention.
Figure 12:
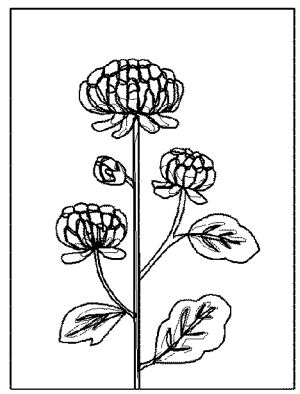
FIG. 12 illustrates a black data insertion (BDI) effect in a duty driving method of a pixel circuit according to an embodiment of the invention.
Figure 12:
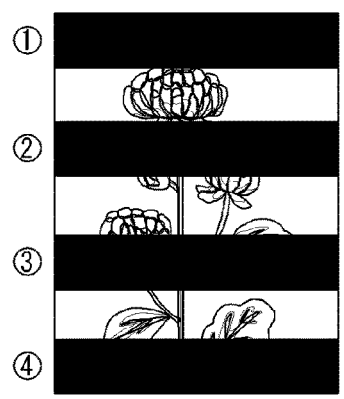
Figure 12:
Figure 12:
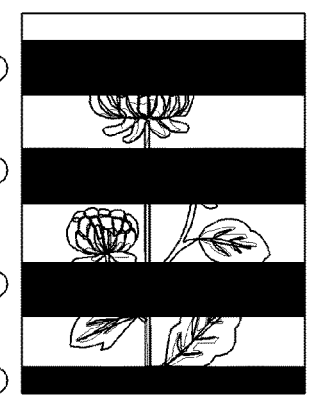
Figure 12:
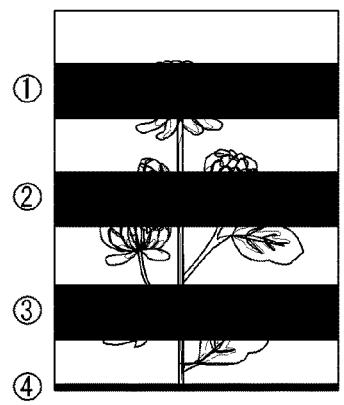
Figure 12:
Figure 12:
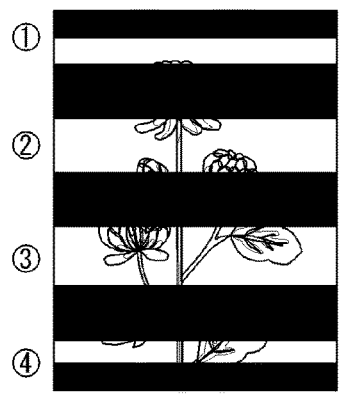
Figure 13:
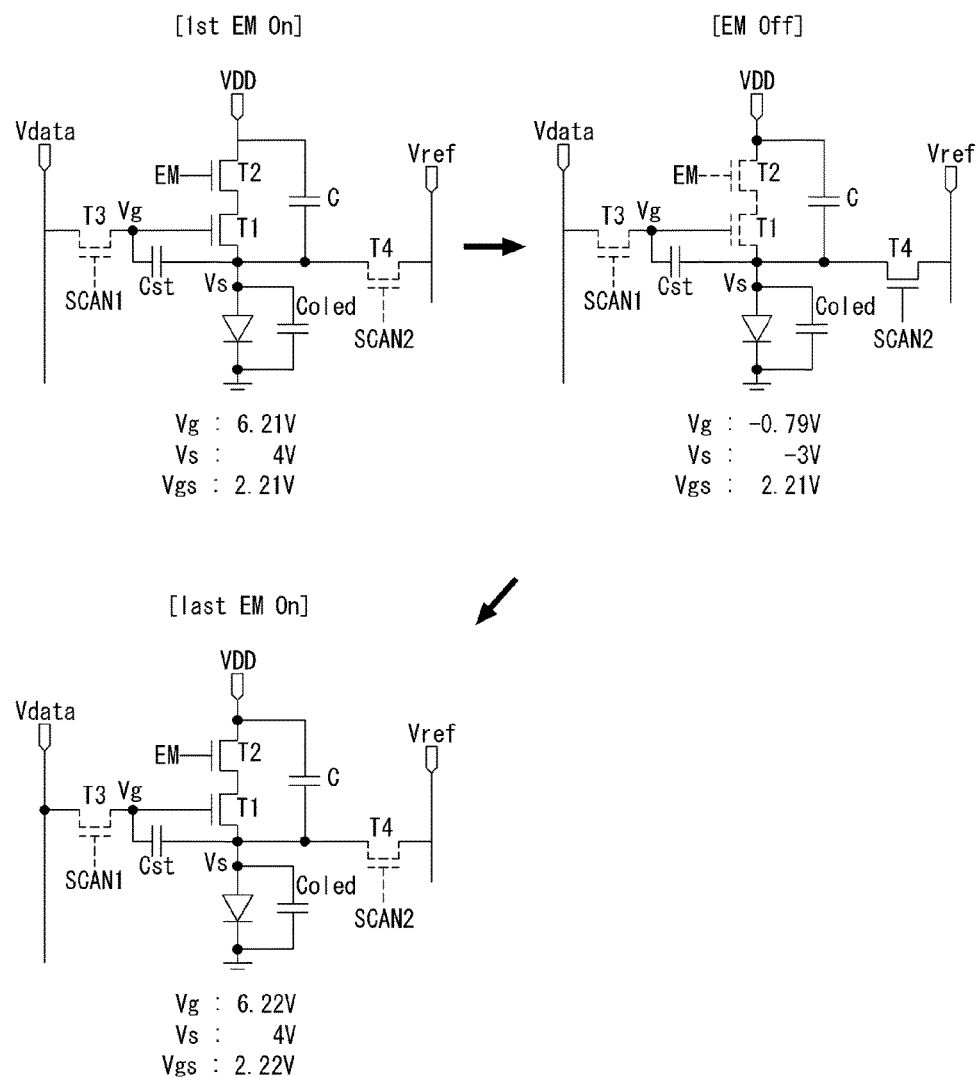
FIG. 13 illustrates a principle, in which data of a pixel is maintained during one frame period without additional data addressing.

FIG. 11 is a waveform diagram illustrating a duty driving method of a pixel circuit according to the embodiment of the invention. FIG. 12 illustrates a BDI effect in a duty driving method of a pixel circuit according to the embodiment of the invention. In FIG. 12, (a) shows an image of one frame. (b) of FIG. 12 shows an example where a non-duty driving period (i.e., turn-off period) is sequentially shifted when the same image as (a) of FIG. 12 is displayed on the pixels using the duty driving method. FIG. 13 illustrates a principle, in which data of a pixel is maintained during one frame period without additional data addressing.

Referring to FIGS. 11 and 12, the vertical sync signal Vsync is a timing signal defining one frame period. During one frame period, image data corresponding to an amount of one frame is addressed to the pixels 10 and is written on the pixels 10.

Only during an initial scanning period of one frame period, data of an input image is addressed to the pixels 10 and is written on the pixels 10. The pixels 10 are turned off in an off-level period of the EM signal EM. However, as shown in FIG. 10, the pixels 10 hold the data voltage and emit light during a turn-on period after a turn-off period at the same luminance as a turn-on period before the turn-off period.

An on-level period of the EM signal EM defines a turn-on period in the pixel array. The EM signal EM of the on-level forms the current path of the OLED in the pixels 10 and turns on the OLED. On the other hand, the off-level period of the EM signal EM defines a turn-off period in the pixel array. During the turn-off period, the EM signal EM of the off-level is applied to the pixels 10. The pixels 10 of the turn-off period display a black gray level because the current path of the OLED is blocked and the current does not flow in the OLED.

The EM signal EM has two or more cycles during the duty driving period tem of one frame period. One cycle of the EM signal EM includes one on-level period and one off-level period. Thus, the on-level periods and the off-level periods of the EM signal EM alternate with each other during the duty driving period tem, and the adjacent on-level periods are cut off with the off-level period interposed therebetween. Each pixel 10 is turned off due to the EM signal EM one or more times in the duty driving period tem. Because the off-level period of the EM signal EM is shifted along a scanning direction of the display panel, the turn-off period in the pixel array AA is shifted along the off-level period of the EM signal EM as shown in FIG. 11.

The duty driving method drives the pixels 10 at a duty ratio equal to or less than 50% and thus can improve the image retention and the flicker. In particular, the duty driving method can reduce the user's fatigue when the personal immersive device displays the 3D motion picture.

The embodiment of the invention holds the data voltage of the pixels during the duty driving period without additionally writing data on the pixels. This is described with reference to FIG. 13.

Referring to FIG. 13, after data is written on the pixels 10 through the data addressing, the first scan pulse SCAN1 maintains the off-level during one frame period. As a result, after the storage capacitor Cst is charged with the data voltage, the first node A connected to the gate of the first TFT T1 is floated. When a source voltage Vs of the first TFT T1 changes, the gate voltage Vg changes depending on a change in the source voltage Vs while charges of the storage capacitor Cst are uniformly maintained. As a result, after the pixels 10 are turned off due to the on-level period and the off-level period of the EM signal EM, the gate-to-source voltage Vgs of the driving element, i.e., the first TFT T1 may be uniformly held even if data is not again written on the pixels 10. Because the gate-to-source voltage Vgs of the driving element T1 is uniformly held as described above, the data written on the pixels 10 is maintained.

Figure 15:
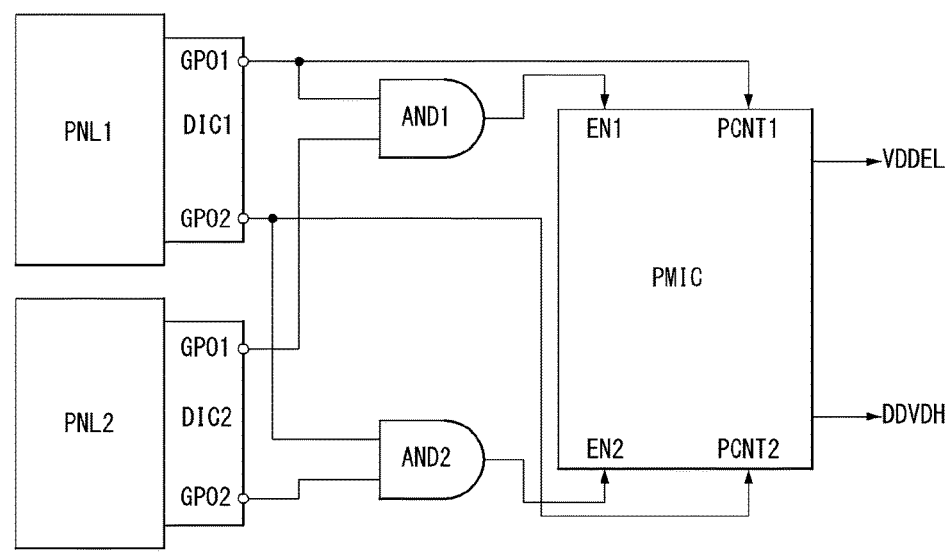
FIGS. 15 and 16 illustrate an AND logic function being performed between driver integrated circuits (ICs) and a power module integrated circuit (PMIC)
Figure 16:
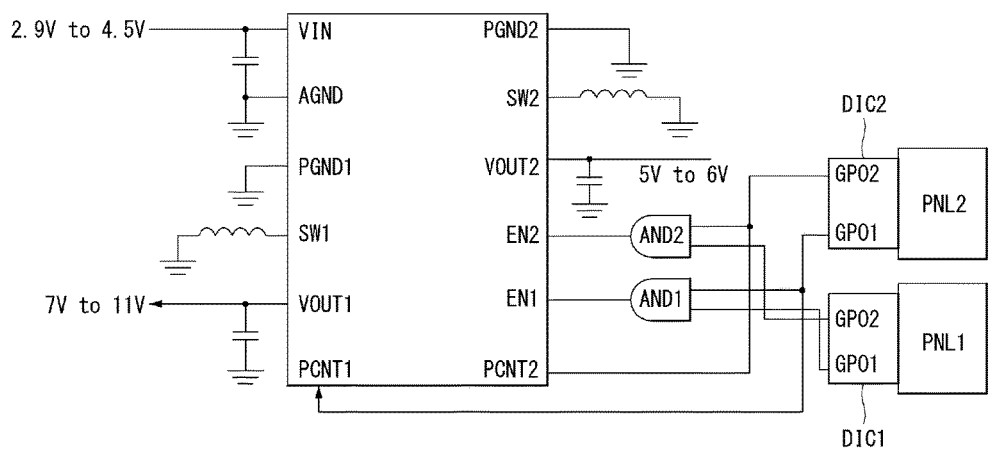

FIG. 14 illustrates a display device of a personal immersive device according to an embodiment of the invention. FIGS. 15 and 16 illustrate an AND logic circuit connected to an enable terminal of a power module integrated circuit (PMIC).

Referring to FIG. 14, a display device according to the embodiment of the invention includes first and second display panels PNL1 and PNL2 and a PMIC.

Each of the first and second display panels PNL1 and PNL2 may be implemented as an OLED display panel. The first and second display panels PNL1 and PNL2 are respectively connected to driver ICs DIC1 and DIC2. The first driver IC DIC1 writes data of an input image to pixels of the first display panel PNL1. The second driver IC DIC2 writes data of an input image to pixels of the second display panel PNL2.

The PMIC generates DC power required to drive the display panels PNL1 and PNL2 using a DC-DC converter. The DC-DC converter includes a charge pump, a regulator, a step-down converter (or a buck converter), a step-up converter (or a boost converter), and the like. The PMIC generates a VDDEL in response to a first enable signal EN1 and generates a DDVDH in response to a second enable signal EN2. Each of the VDDEL and the DDVDH is commonly supplied to the driver ICs DIC1 and DIC2. The VDDEL is a voltage between 7V and 11V, and the DDVDH is a voltage between 5V and 6V. The VDDEL is a pixel driving power as shown in FIG. 9. The DDVDH is a reference driving power applied to a data driver of the driver IC DIC. A gamma compensation voltage generator GMAG of the driver IC DIC divides the DDVDH using a voltage divider and generates a gamma compensation voltage. The charge pump of the PMIC is supplied with the VDDEL and outputs a gate high voltage VGH and a gate low voltage VGL. The gate high voltage VGH is a high level voltage of a scan pulse and an EM pulse, and the gate low voltage VGH is a low level voltage of the scan pulse and the EM pulse.

Each of the driver ICs DIC1 and DIC2 includes a timing controller TCON, a gamma compensation voltage generator GMAG, and a data driver. The data driver includes a data latch DL, a level shifter LS, a digital-to-analog converter DAC, and an output buffer AMP.

The DDVDH is supplied to the gamma compensation voltage generator GMAG, the level shifter LS, the digital-to-analog converter DAC, and the output buffer AMP, as a reference power.

The gamma compensation voltage generator GMAG divides the DDVDH and outputs a gamma compensation voltage having a different voltage level at each gray level. The gamma compensation voltage generator GMAG supplies the gamma compensation voltage to the digital-to-analog converter DAC. The data latch DL latches data received from the timing controller TCON and at the same time outputs the data, converting serial data into parallel data. The level shifter LS shifts a voltage level of data received from the data latch DL to a range of an input voltage of the digital-to-analog converter DAC. The digital-to-analog converter DAC converts data input from the level shifter LS into the gamma compensation voltage and generates a data voltage. A voltage level of the data voltage output from the digital-to-analog converter DAC varies depending on a gray level of data. The output buffer AMP transfers the data voltage input from the digital-to-analog converter DAC to data lines of the display panels PNL1 and PNL2 using a voltage follower implemented as an operational amplifier (op-amp).

Figure 19:
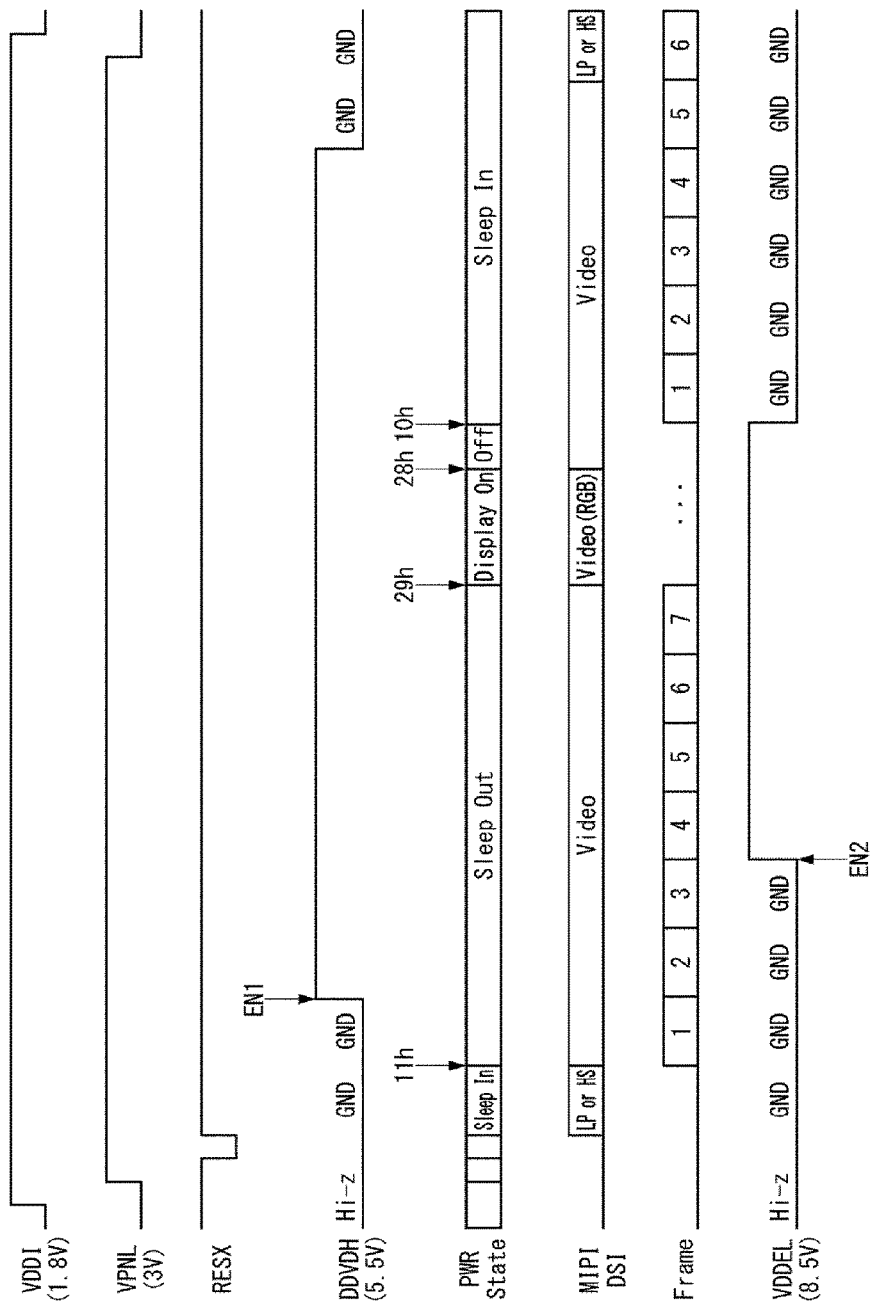
FIG. 19 illustrates a normal power-on sequence of a driver IC.

The display device according to the embodiment of the invention generates electric power required to drive the two driver ICs DIC1 and DIC2 and the two display panels PNL1 and PNL2 using one PMIC. However, if the enable signals EN1 and EN2 output from the driver ICs DIC1 and DIC2 are not synchronized with each other, the driver ICs DIC1 and DIC2 may be damaged or burnt due to heat generation. For example, the first driver IC DIC1 may output the enable signals EN1 and EN2 earlier than the second driver IC DIC2. The PMIC may output the VDDEL and the DDVDH in response to the enable signals EN1 and EN2. The PMIC may generate the driving voltages VDDEL and DDVDH in response to the enable signals EN1 and EN2 from the first driver IC DIC1 in a state where initialization of the second driver IC DIC2 is not completed. In this instance, because the driving voltages VDDEL and DDVDH are input to the second driver IC DIC2 that does not go through a normal initialization process, the second driver IC DIC2 may malfunction or be burnt. Further, the second display panel PNL2 connected to the second driver IC DIC2 may be abnormally driven. For example, if the DDVDH is applied to the driver ICs DIC1 and DIC2 before VDDI (e.g., 1.8V) and VPNL (e.g., 3V) shown in FIG. 19 are applied to the driver ICs DIC1 and DIC2, the driver ICs DIC1 and DIC2 may be burnt or the display panels PNL1 and PNL2 may be abnormally driven.

In order to prevent the asynchronization of the driver ICs DIC1 and DIC2 caused when one PMIC generates electric power required to drive the two driver ICs DIC1 and DIC2 and the two display panels PNL1 and PNL2, the embodiment of the invention synchronizes the enable signals EN1 and EN2 output from the driver ICs DIC1 and DIC2 using an AND logic circuit shown in FIGS. 15 and 16. Accordingly, even if the enable signals output from the driver ICs are not synchronized when one PMIC generates the electric power of the driver ICs and the display panels, the embodiment of the invention can prevent a malfunction or burning of the driver ICs or an abnormal drive of the display panels.

FIGS. 15 and 16 illustrate an AND logic circuit connected between the driver ICs and the PMIC. There are a number of circuits that can perform the AND logic function. Of course, one acceptable circuit is a standard AND gate of a type well known in the art. The AND logic function is one in which if all inputs are enabled, then the output will be enabled. But, if any one input is disabled, then the output will be disabled. Namely, in the AND logic circuit, for the AND logic function to be carried out, all inputs are must be the enabled for the output to be enabled and if all of them are disable or even one is disabled, then the output is disabled. (Sometimes the words "high" and "low" are used for enable and disable, respectively.) As is known in the art, an AND logic circuit can have more than two inputs. It is known to have three, four, five or more input AND gates and AND logic circuits. It is also known to provide an inverting function after an AND logic circuit, which is called a NAND gate or NAND logic function. Thus, since a NAND logic circuit includes an AND followed by an inverter, it would be considered to have within it the AND logic function and thus be an AND logic circuit is some embodiments. While in some embodiments, a strict AND function will be needed that this would exclude a NAND, in other embodiments, the AND logic function can be carried out with either AND logic circuit or a NAND logic circuit.

Referring to FIGS. 15 and 16, the display device according to the embodiment of the invention includes first and second AND gates AND1 and AND2 for synchronizing the enable signals EN1 and EN2 output from the first and second driver ICs DIC1 and DIC2.

Each of the first and second driver ICs DIC1 and DIC2 outputs the first enable signal EN1 through a first general purpose output (GPO) terminal GPO1 and outputs the second enable signal EN2 through a second GPO terminal GPO2.

Figure 18:
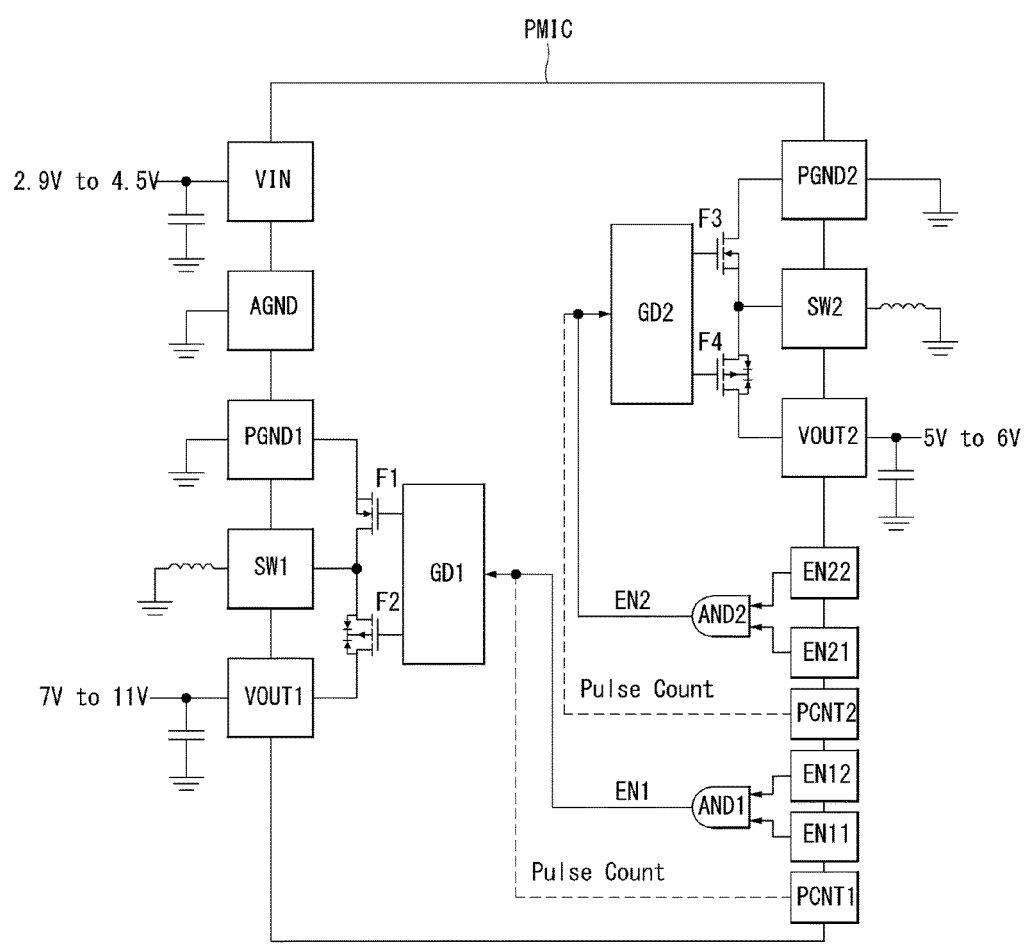
FIG. 18 illustrates AND gates embedded in a PMIC.

The first AND gate AND1 performs an AND operation on signals input from the first GPO terminals GPO1 of the first and second driver ICs DIC1 and DIC2, finally outputs the first enable signal EN1 as a result of the AND operation, and supplies the final first enable signal EN1 to a first enable signal input terminal of the PMIC. The second AND gate AND2 performs an AND operation on signals input from the second GPO terminals GPO2 of the first and second driver ICs DIC1 and DIC2, finally outputs the second enable signal EN2 as a result of the AND operation, and supplies the final second enable signal EN2 to a second enable signal input terminal of the PMIC. The first and second AND gates AND1 and AND2 may be embedded in the PMIC as shown in FIG. 18.

Each of the first and second AND gates AND1 and AND2 generates an output of a high logic level only when all of input signals are generated at a high logic level. Thus, even if the first enable signals EN1 output from the first and second driver ICs DIC1 and DIC2 are not synchronized with each other, the first enable signals EN1 are synchronized with each other by the first AND gate AND1. In the same manner as the first AND gate AND1, even if the second enable signals EN2 output from the first and second driver ICs DIC1 and DIC2 are not synchronized with each other, the second enable signals EN2 are synchronized with each other by the second AND gate AND2.

In FIG. 16, "VIN" is an input voltage of the PMIC. "AGND" and "PGND" are terminals of a ground level voltage GND. "SW1" is a terminal for connecting a first inductor to first switching elements (for example, implemented as field effect transistors (FETs)) inside the PMIC. "VOUT1" is an output terminal that is connected to a first capacitor and outputs the VDDEL. "SW2" is a terminal for connecting a second inductor to second switching elements (for example, implemented as FETs) inside the PMIC. "VOUT2" is an output terminal that is connected to a second capacitor and outputs the DDVDH. "PCNT1" is a first pulse count input terminal, to which the first enable signal generated in one of the first and second driver ICs DIC1 and DIC2 is directly applied. "PCNT2" is a second pulse count input terminal, to which the second enable signal generated in one of the first and second driver ICs DIC1 and DIC2 is directly applied.

The PMIC includes a first step-up converter that counts pulses of the first enable signal EN1, that is input through the first pulse count input terminal PCNT1 for an enable time, and gradually increases the voltage VDDEL. The PMIC includes a second step-up converter that counts pulses of the second enable signal EN2, that is input through the second pulse count input terminal PCNT2 for an enable time, and gradually increases an output voltage. Each time the number of pulses of the enable signal increases by one, the voltage may increase by 0.1V.

Figure 17A:
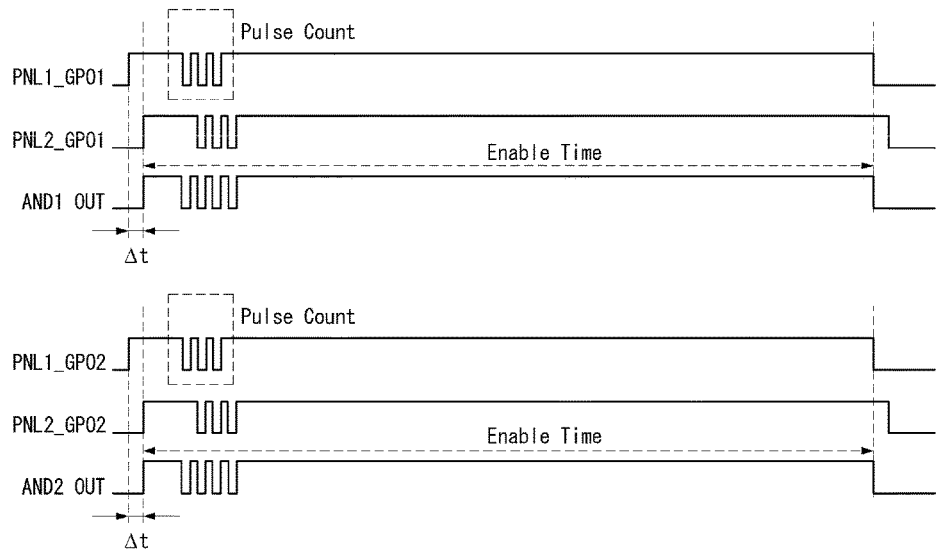
FIGS. 17A and 17B are waveform diagrams illustrating enable signals output from driver ICs and an output of AND gates.
Figure 17B:
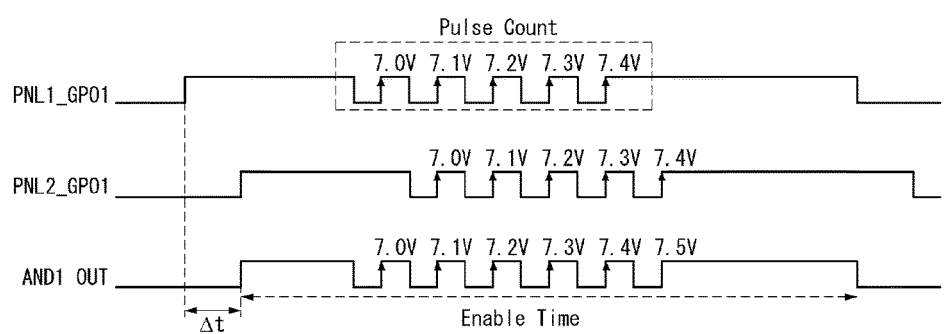

The PCNT1 and PCNT2 directly receive the enable signal from the driver IC without passing through the AND gate. As shown in FIGS. 17A and 17B, when the enable signals output from the two driver ICs are input to the AND gate, the enable signals are synchronized by the AND gate. However, the number of pulses of the enable signal may change, and thus an output voltage of the PMIC may change. Thus, the PCNT1 and PCNT2 may not pass through the AND gate.

FIGS. 17A and 17B are waveform diagrams illustrating enable signals output from driver ICs and an output of AND gates. In FIGS. 17A and 17B, "PNL1_GPO1" is a first enable signal output from the first driver IC DIC1, and "PNL2_GPO1" is a first enable signal output from the second driver IC DIC2. A first AND gate AND1 outputs a result of an AND operation of the PNL1_GPO1 and the PNL2_GPO1. An output AND1_OUT of the first AND gate AND1 is a final first enable signal EN1 and is input to the PMIC. "PNL1_GPO2" is a second enable signal output from the first driver IC DIC1, and "PNL2_GPO2" is a second enable signal output from the second driver IC DIC2. A second AND gate AND2 outputs a result of an AND operation of the PNL1_GPO2 and the PNL2_GPO2. An output AND2_OUT of the second AND gate AND2 is a final second enable signal EN2 and is input to the PMIC.

When the outputs AND1_OUT and AND2_OUT of the AND gates are input to the PMIC, an output voltage of the PMIC may change by an output time difference Δt between the driver ICs DIC1 and DIC2. For example, as shown in FIG. 17A, when the first enable signals PNL1_GPO1 and PNL2_GPO1 output from the driver ICs DIC1 and DIC2 each include two pulse for an enable time in accordance with an original intention of a design, the output AND1_OUT of the first AND gate AND1 includes three pulses because the number of pulses of the first enable signal increases due to the output time difference Δt between the driver ICs DIC1 and DIC2. In an example of FIG. 17B, when the outputs AND1_OUT and AND2_OUT of the AND gates AND1 and AND2 are input to the terminals PCNT1 and PCNT2 of the PMIC, an output voltage of the PMIC is not a desired voltage "7.4V" of the user but 7.5V due to the output time difference Δt between the driver ICs DIC1 and DIC2. Thus, the embodiment of the invention directly connects the first GPO terminal GPO1 of one of the first and second driver ICs DIC1 and DIC2 to the terminal PCNT1 of the PMIC and connects the second GPO terminal GPO2 of one of the first and second driver ICs DIC1 and DIC2 to the terminal PCNT2 of the PMIC, thereby preventing a pulse count error.

FIG. 18 illustrates AND gates embedded in a PMIC. Since components (for example, a feedback sensing circuit, an overcurrent and overvoltage limit protective circuit, a temperature limit circuit, etc.) of the PMIC, that are not directly related to the embodiment of the invention, are already known, they are omitted in FIG. 8.

Referring to FIG. 18, the PMIC includes first and second AND gates AND1 and AND2, a first step-up converter GD1, a second step-up converter GD2, and the like.

The PMIC further includes input terminals EN11, EN12, EN21, and EN22 of the first and second AND gates AND1 and AND2. The input terminal EN11 is connected to the first GPO terminal GPO1 of the first driver IC DIC1, and the input terminal EN12 is connected to the first GPO terminal GPO1 of the second driver IC DIC2. The input terminal EN21 is connected to the second GPO terminal GPO2 of the first driver IC DIC1, and the input terminal EN22 is connected to the second GPO terminal GPO2 of the second driver IC DIC2.

The first step-up converter GD1 adjusts an on-time and an off-time of first switching elements F1 and F2 by a pulse width modulation (PWM) control in response to the first enable signal EN1 received from the first AND gate AND1 for an enable time and outputs the VDDEL greater than an input voltage VIN. The first switching elements F1 and F2 include an n-type transistor F1 that is connected between an inductor and a capacitor and is turned on and off depending on a gate voltage, and a p-type transistor F2 that is connected between an inductor and a terminal of a ground level voltage GND and is turned on and off depending on a gate voltage. The transistors F1 and F2 are implemented as a MOSFET or a FET. When the n-type transistor F1 is turned on and the p-type transistor F2 is turned off, the inductor is charged. Further, when the n-type transistor F1 is turned off and the p-type transistor F2 is turned on, the input voltage VIN and a voltage discharged from the inductor are added. The added voltage is supplied to a capacitor connected to the output terminal VOUT1 as the VDDEL. The first step-up converter GD1 counts the number of pulses of the first enable signal PNL1_GPO1 input through the terminal PCNT1 and increases a reference voltage of a comparator (not shown) in proportion to the number of pulses, thereby increasing a duty ratio of a gate signal applied to the first switching elements F1 and F2. Hence, the first step-up converter GD1 can control the VDDEL. Each time the number of pulses increases by one, the voltage VDDEL output through the output terminal VOUT1 increases by 0.1 V.

The second step-up converter GD2 adjusts an on-time and an off-time of second switching elements F3 and F4 by a PWM control in response to the second enable signal EN2 received from the second AND gate AND2 for the enable time and outputs the DDVDH greater than the input voltage VIN. The second switching elements F3 and F4 include a p-type transistor F4 that is connected between an inductor and a capacitor and is turned on and off depending on a gate voltage, and an n-type transistor F3 that is connected between an inductor and the terminal of the ground level voltage GND and is turned on and off depending on a gate voltage. The second switching elements F3 and F4 are implemented as a MOSFET or a FET. When the n-type transistor F3 is turned on and the p-type transistor F4 is turned off, the inductor is charged. Further, when the n-type transistor F3 is turned off and the p-type transistor F4 is turned on, the input voltage VIN and a voltage discharged from the inductor are added. The added voltage is supplied to a capacitor connected to the output terminal VOUT2 as the DDVDH. The second step-up converter GD2 counts the number of pulses of the second enable signal PNL1_GPO2 input through the terminal PCNT2 and increases a reference voltage of the comparator in proportion to the number of pulses, thereby increasing a duty ratio of a gate signal applied to the second switching elements F3 and F4. Hence, the second step-up converter GD2 can control the DDVDH. Each time the number of pulses increases by one, the voltage DDVDH output through the output terminal VOUT2 increases by 0.1 V.

FIG. 19 illustrates a normal power-on sequence of a driver IC.

Referring to FIG. 19, when power is input to the personal immersive device, the input voltage VIN is input to the PMIC, and the voltages VDDI, VPNL, and RESX are sequentially input to the driver ICs DIC1 and DIC2. Hence, internal circuits are initialized. In a power-on sequence, after the driver ICs DIC1 and DIC2 are initialized, the driver ICs DIC1 and DIC2 have to supply the enable signals to the PMIC and receive the DDVDH output from the PMIC. In this instance, the driver ICs DIC1 and DIC2 are normally driven. In FIG. 19, "VDDI (Typ.1.8V)" is a logic voltage of the driver IC, and "VPNL (Typ.3V)" is a reference voltage of the driver IC. The VDDI and the VPNL are generated in a power circuit of the main board 14 and are supplied to the driver IC. "RESX" is a reset signal of the driver IC. "PWR State" is a signal indicating a current state (VDDEL On/OFF state) of the driver IC. The signal PWR State is transmitted to an application processor (AP) and the driver IC through a mobile industry processor interface (MIPI). In response to the signal PWR State, the driver ICs DIC1 and DIC2 output a data voltage of an input image during a display-on period after "Sleep Out". "11h", "29h", "28h", and "10h" are memory addresses. "MIPI DSI" is a MIPI setting value, such as MIPI signal mode (HS: high speed mode and LP: low power mode) and video data application time point. The low power mode LP is a transmission mode of 1.2V, and the high speed mode HS is a high-speed transmission mode of 200 mV. "Frame" is a number of a frame period. "Hi-Z" is high impedance.

As described above, the PMIC generates an output for an enable time indicated by enable signals EN1 and EN2 received from the driver ICs DIC1 and DIC2. When one of the two driver ICs DIC1 and DIC2 generates the enable signal because the two driver ICs DIC1 and DIC2 are not synchronized, and the PMIC generates an output, the VDDH may be applied to the other driver IC, of which the initialization is not yet completed, thereby leading to a malfunction or a damage of the other driver IC. Thus, the embodiment of the invention synchronizes the enable signals output from the driver ICs using an AND logic circuit, so that the PMIC can generate an output in a state where all of the two driver ICs can be normally driven.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a first driver integrated circuit configured to drive a first pixel array;
   a second driver integrated circuit configured to drive a second pixel array;
   a power module integrated circuit configured to receive an enable signal and output a driving voltage; and
   an AND logic circuit having a first input coupled to an output of the first driver and a second input coupled to an output of the second driver, the AND logic circuit configured to receive an output of the first driver integrated circuit and an output of the second driver integrated circuit and output the enable signal,
   wherein the driving voltage output from the power module integrated circuit is commonly supplied to the first and second driver integrated circuits.

2. The display device of claim 1, wherein the AND logic circuit includes:
   a first AND gate configured to receive an output signal output through a first output terminal of the first driver integrated circuit and an output signal output through a first output terminal of the second driver integrated circuit and output a first enable signal; and
   a second AND gate configured to receive an output signal output through a second output terminal of the first driver integrated circuit and an output signal output through a second output terminal of the second driver integrated circuit and output a second enable signal,
   wherein each of the output signals output through the first and second output terminals includes a plurality of pulses.

3. The display device of claim 2, wherein the power module integrated circuit outputs a first driving voltage in response to the first enable signal and commonly supplies the first driving voltage to the first and second driver integrated circuits, and
   wherein the power module integrated circuit outputs a second driving voltage in response to the second enable signal and commonly supplies the second driving voltage to the first and second driver integrated circuits.

4. The display device of claim 3, wherein the power module integrated circuit directly receives the output signals output through the first and second output terminals of one of the first and second driver integrated circuits.

5. The display device of claim 4, wherein the power module integrated circuit includes:
   a first step-up converter configured to adjust the first driving voltage depending on a number of pulses of the output signal output through the first output terminal; and
   a second step-up converter configured to adjust the second driving voltage depending on a number of pulses of the output signal output through the second output terminal.

6. A method of driving a display device including a first driver integrated circuit driving a first pixel array, a second driver integrated circuit driving a second pixel array, and a power module integrated circuit connected to the first and second driver integrated circuits, the method comprising:
   synchronizing an output of the first driver integrated circuit with an output of the second driver integrated circuit using an AND gate to supply the synchronized outputs of the first and second driver integrated circuits to the power module integrated circuit;
   outputting a driving voltage from the power module integrated circuit in response to an output of the AND gate; and
   supplying the driving voltage to the first and second driver integrated circuits.

7. The method of claim 6, further comprising:
   directly supplying the output of one of the first and second driver integrated circuits to the power module integrated circuit; and
   counting pulses of a signal, that is directly received from one of the first and second driver integrated circuits, by the power module integrated circuit to adjust the driving voltage.

8. The method of claim 7, wherein the synchronizing of the output of the first driver integrated circuit with the output of the second driver integrated circuit using the AND gate to supply the synchronized outputs to the power module integrated circuit includes:
   outputting a result of an AND operation of an output signal output through a first output terminal of the first driver integrated circuit and an output signal output through a first output terminal of the second driver integrated circuit using a first AND gate, as a first enable signal, and supplying the first enable signal to a first enable terminal of the power module integrated circuit; and
   outputting a result of an AND operation of an output signal output through a second output terminal of the first driver integrated circuit and an output signal output through a second output terminal of the second driver integrated circuit using a second AND gate, as a second enable signal, and supplying the second enable signal to a second enable terminal of the power module integrated circuit,
   wherein each of the output signals output through the first and second output terminals includes a plurality of pulses.

9. The method of claim 8, wherein the outputting of the driving voltage from the power module integrated circuit in response to the output of the AND gate includes:
   outputting a first driving voltage from the power module integrated circuit in response to the first enable signal to commonly supply the first driving voltage to the first and second driver integrated circuits; and
   outputting a second driving voltage from the power module integrated circuit in response to the second enable signal to commonly supply the second driving voltage to the first and second driver integrated circuits.

10. The method of claim 9, wherein the directly supplying of the output of one of the first and second driver integrated circuits to the power module integrated circuit includes:

directly supplying the output signal output through the first output terminal of one of the first and second driver integrated circuits to the power module integrated circuit; and directly supplying the output signal output through the second output terminal of one of the first and second driver integrated circuits to the power module integrated circuit.

11. The method of claim 10, wherein the counting pulses of the signal, that is directly received from one of the first and second driver integrated circuits, by the power module integrated circuit to adjust the driving voltage includes:

adjusting the first driving voltage depending on a number of pulses of the output signal output through the first output terminal; and adjusting the second driving voltage depending on a number of pulses of the output signal output through the second output terminal.

12. A personal immersive device comprising:

a first driver integrated circuit configured to drive a first pixel array;

a second driver integrated circuit configured to drive a second pixel array;

a power module integrated circuit configured to receive a synchronization enable signal and output a driving voltage according to the synchronization enable signal; and an AND logic circuit having a first input coupled to an output of the first driver and a second input coupled to an output of the second driver, the AND logic circuit configured to receive an enable signal output from the first driver and an enable signal output from the second driver and perform an AND operation on the enable signal of the first driver and the enable signal of the second driver received to output the synchronization enable signal, wherein the driving voltage output from the power module integrated circuit is commonly supplied to the first and second drivers.

13. The personal immersive device of claim 12, wherein the AND gate includes:

a first AND gate configured to receive an enable signal output through a first output terminal of the first driver and an enable signal output through a first output terminal of the second driver and output a first synchronization enable signal; and a second AND gate configured to receive an enable signal output through a second output terminal of the first driver and an enable signal output through a second output terminal of the second driver and output a second synchronization enable signal, wherein each of the enable signals output through the first and second output terminals includes a plurality of pulses.

14. The personal immersive device of claim 13, wherein the power module integrated circuit outputs a first driving voltage in response to the first synchronization enable signal and commonly supplies the first driving voltage to the first and second drivers, and wherein the power module integrated circuit outputs a second driving voltage in response to the second synchronization enable signal and commonly supplies the second driving voltage to the first and second drivers.

15. The personal immersive device of claim 14, wherein the power module integrated circuit also receives the enable signals output through the first and second output terminals of one of the first and second drivers.

16. The personal immersive device of claim 15, wherein the power module integrated circuit includes:

a first step-up converter configured to adjust the first driving voltage depending on a number of pulses of the enable signal output through the first output terminal; and a second step-up converter configured to adjust the second driving voltage depending on a number of pulses of the enable signal output through the second output terminal.

17. The personal immersive device of claim 12, wherein the first pixel array and the second pixel array are separated from each other.

* * * * *